US011526954B2

(12) United States Patent
Turgman et al.

(10) Patent No.: US 11,526,954 B2
(45) Date of Patent: Dec. 13, 2022

(54) USER INTERFACE AND SMART CONTRACT INTERACTION MODEL FOR GENERATING USER INTERFACE REPRESENTATIONS

(71) Applicant: Microsoft Technology Licensing, LLC, Redmond, WA (US)

(72) Inventors: Ami Turgman, Tel Aviv (IL); Yosef Dinerstein, Haifa (IL); Ashwarya Poddar, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 708 days.

(21) Appl. No.: 16/412,026

(22) Filed: May 14, 2019

(65) Prior Publication Data

US 2020/0364813 A1 Nov. 19, 2020

(51) Int. Cl.
*G06Q 50/18* (2012.01)
*G06Q 20/40* (2012.01)
(Continued)

(52) U.S. Cl.
CPC ....... *G06Q 50/188* (2013.01); *G06Q 20/4016* (2013.01); *G06Q 20/40975* (2013.01);
(Continued)

(58) Field of Classification Search
CPC ............. G06Q 50/188; G06Q 20/4016; G06Q 20/40975; G06Q 30/0619; G06Q 2220/00;
(Continued)

(56) References Cited

U.S. PATENT DOCUMENTS 6,484,182 B1 11/2002 Dunphy et al.
6,961,858 B2 11/2005 Fransdonk et al.
(Continued)

FOREIGN PATENT DOCUMENTS

CN 107122958 A 9/2017
WO 2018204541 A1 11/2018

OTHER PUBLICATIONS

Choi, Katat, "What could blockchains offer to freelancers?", Retrieved from https://medium.com/swlh/what-could-blockchains-offer-to-freelancers-61019a084f80, May 10, 2018, 12 Pages.
(Continued)

*Primary Examiner* — Zeshan Qayyum
(74) *Attorney, Agent, or Firm* — Fiala & Weaver P.L.L.C.

(57) ABSTRACT

Embodiments described herein provide a user interface for interacting with a smart contract deployed to a blockchain. The user interface is custom-generated for each party to the smart contract. In particular, representations of actions that a particular party is enabled to perform and/or has already taken with respect to the smart contract are provided to that party via a user interface. A user experience generator queries the smart contract itself to determine which representations are to be provided to each party. The smart contract comprises functions and/or user experience annotations that indicate to the user experience generator which user interface representations should be provided to a particular user based on the party identity and/or the smart contract's state. The smart contract provides an event notification to the user experience generator, which prompts the user experience generator to query the smart contract to determine the allowed actions for a particular user.

20 Claims, 15 Drawing Sheets

(51) Int. Cl.
  *G06Q 30/06* (2012.01)
  *H04L 9/06* (2006.01)
  *H04L 9/00* (2022.01)

(52) U.S. Cl.
  CPC ....... *H04L 9/0637* (2013.01); *G06Q 30/0619* (2013.01); *G06Q 2220/00* (2013.01); *H04L 9/50* (2022.05); *H04L 2209/56* (2013.01)

(58) Field of Classification Search
  CPC ...... G06Q 10/06; G06Q 50/10; H04L 9/0637; H04L 2209/38; H04L 2209/56; H04L 9/3239; H04L 63/00
  USPC .......................................................... 705/50
  See application file for complete search history.

(56) References Cited

U.S. PATENT DOCUMENTS

| | | |
|---|---|---|
| 7,020,635 B2 | 3/2006 | Hamilton et al. |
| 7,080,049 B2 | 7/2006 | Truitt et al. |
| 7,090,128 B2 | 8/2006 | Farley et al. |
| 7,107,462 B2 | 9/2006 | Fransdonk et al. |
| 7,150,045 B2 | 12/2006 | Koelle et al. |
| 7,529,679 B1 | 5/2009 | Pomerance |
| 7,587,502 B2 | 9/2009 | Crawford et al. |
| 7,711,586 B2 | 5/2010 | Aggarwal et al. |
| 9,849,364 B2 | 12/2017 | Tran et al. |
| 9,910,848 B2 | 3/2018 | Beller et al. |
| 10,476,847 B1 | 11/2019 | Smith et al. |
| 10,482,554 B1 | 11/2019 | Vukich et al. |
| 11,100,093 B2 | 8/2021 | Cheng et al. |
| 11,100,502 B1 | 8/2021 | Rainey et al. |
| 2002/0147604 A1 | 10/2002 | Slate et al. |
| 2003/0014265 A1 | 1/2003 | Landry et al. |
| 2004/0128155 A1 | 7/2004 | Vaidyanathan et al. |
| 2006/0085253 A1 | 4/2006 | Mengerink et al. |
| 2010/0125526 A1 | 5/2010 | Hurley et al. |
| 2011/0047008 A1 | 2/2011 | Rule |
| 2012/0198357 A1 | 8/2012 | Tozzi |
| 2013/0203383 A1 | 8/2013 | Stopel et al. |
| 2014/0032428 A1 | 1/2014 | Tozzi |
| 2014/0379589 A1 | 12/2014 | Ratcliffe |
| 2016/0335533 A1 | 11/2016 | Davis et al. |
| 2017/0109735 A1 | 4/2017 | Sheng et al. |
| 2017/0148118 A1 | 5/2017 | Fuller et al. |
| 2017/0206603 A1 | 7/2017 | Al-masoud |
| 2017/0220998 A1 | 8/2017 | Horn et al. |
| 2017/0232300 A1 | 8/2017 | Tran et al. |
| 2017/0256001 A1 | 9/2017 | Isaacson et al. |
| 2017/0279774 A1 | 9/2017 | Booz et al. |
| 2017/0287090 A1 | 10/2017 | Hunn et al. |
| 2018/0005186 A1* | 1/2018 | Hunn .................... G06F 16/93 |
| 2018/0047111 A1 | 2/2018 | Vieira et al. |
| 2018/0091316 A1 | 3/2018 | Stradling et al. |
| 2018/0143995 A1 | 5/2018 | Bailey et al. |
| 2018/0218176 A1 | 8/2018 | Voorhees et al. |
| 2018/0264347 A1 | 9/2018 | Tran et al. |
| 2018/0300741 A1 | 10/2018 | Leonard et al. |
| 2018/0341648 A1* | 11/2018 | Kakavand .............. G06Q 50/18 |
| 2018/0343307 A1 | 11/2018 | Lotter et al. |
| 2019/0034402 A1 | 1/2019 | Anderson et al. |
| 2019/0034404 A1 | 1/2019 | Anderson et al. |
| 2019/0058709 A1 | 2/2019 | Kempf et al. |
| 2019/0108140 A1 | 4/2019 | Deshpande et al. |
| 2019/0108232 A1 | 4/2019 | Calcaterra et al. |
| 2019/0122317 A1 | 4/2019 | Hunn et al. |
| 2019/0188787 A1 | 6/2019 | Besanson Tuma et al. |
| 2019/0205884 A1 | 7/2019 | Batra et al. |
| 2019/0370799 A1 | 12/2019 | Vivas et al. |
| 2019/0377904 A1 | 12/2019 | Sinha et al. |
| 2019/0392511 A1 | 12/2019 | Mahajan et al. |
| 2020/0027117 A1 | 1/2020 | Cotsakos et al. |
| 2020/0104958 A1 | 4/2020 | Cheng-shorland et al. |
| 2020/0111187 A1 | 4/2020 | Vukich et al. |
| 2020/0118068 A1 | 4/2020 | Turetsky et al. |
| 2020/0184431 A1 | 6/2020 | Sinmao et al. |
| 2020/0184556 A1 | 6/2020 | Cella |
| 2020/0219150 A1 | 7/2020 | Johnston |
| 2020/0294128 A1 | 9/2020 | Cella |
| 2020/0313982 A1 | 10/2020 | Todd |
| 2020/0349561 A1 | 11/2020 | Kuchkovsky Jimenez et al. |
| 2020/0372505 A1 | 11/2020 | Turgman et al. |
| 2020/0380624 A1 | 12/2020 | Turgman et al. |
| 2021/0019740 A1 | 1/2021 | Bhamidipati et al. |
| 2021/0118051 A1 | 4/2021 | Gee et al. |
| 2021/0241273 A1 | 8/2021 | Abad et al. |
| 2021/0248514 A1 | 8/2021 | Cella et al. |
| 2021/0390191 A1 | 12/2021 | Doney |

OTHER PUBLICATIONS

Hertig, Alyssa, "WeChat-Inspired Wallets Are Coming to Ethereum", Retrieved from https://www.coindesk.com/wechat-wallet-ethereum-blockchain-status, Nov. 30, 2016, 8 Pages.

Marks, Erik, "The Case for Graphical Smart Contract Editors", Retrieved From: https://medium.com/pennblockchain/the-case-for-graphical-smart-contract-editors-8e721cdcde93, Apr. 30, 2018, 4 Pages.

"International Search Report and Written Opinion Issued in PCT Application No. PCT/US2020/024542", dated May 27, 2020, 12 Pages.

"Final Office Action Issued in U.S. Appl. No. 16/428,611", dated May 31, 2022, 18 Pages.

"Final Office Action Issued in U.S. Appl. No. 16/421,102", dated Apr. 8, 2022, 22 Pages.

"Non Final Office Action Issued in U.S. Appl. No. 16/421,102", dated Sep. 1, 2021, 26 Pages.

"Non Final Office Action Issued in U.S. Appl. No. 16/428,611", dated Mar. 17, 2022, 14 Pages.

Clack, et al., "Smart Contract Templates: Foundations. Design Landscape and Research Directions", In Repository of arXiv:1608.00771v3, Mar. 15, 2017, 15 Pages.

"International Search Report and Written Opinion Issued in PCT Application No. PCT/US20/026036", dated May 19, 2020, 13 Pages.

"International Search Report and Written Opinion Issued in PCT Application No. PCT/US2020/026025", dated Jun. 29, 2020, 13 Pages.

Rozario, et al., "Auditing with Smart Contracts", In International Journal of Digital Accounting Research, vol. 18, Feb. 2018, 27 Pages.

"Notice of Allowance Issued in U.S. Appl. No. 16/421,102", dated Aug. 1, 2022, 14 Pages.

Frantz, et al., "From Institutions to Code: Towards Automated Generation of Smart Contracts", In Proceedings of IEEE 1st International Workshops on Foundations and Applications of Self* Systems, Sep. 12, 2016, pp. 210-215.

U.S. Appl. No. 16/421,102, filed May 23, 2019.
U.S. Appl. No. 16/428,611, filed May 31, 2019.

* cited by examiner

| https://www.example.com |

We agree that provider Bob Brown will perform translation services for consumer Charlie Clark for the following amount: 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. The contract is sealed when two parties sign the contract. After completion of work, both the provider and the consumer agree to release funds to the provider (the reward and the deposit). If a dispute arises, each of the parties may initiate dispute resolution. The mediator David Doe, if involved, will be entitled to 5 % of the reward. The mediator will resolve the conflict by splitting the funds, after taking the fee, between the consumer and the provider.

702

Provider (Bob Brown) deposited 0 Finney — 708

Consumer (Charlie Clark) deposited 0 Finney — 706

The state of the contract is "Pending". — 710

Sign the contract. Transfer 20 Finney upon singing. — 704   712 [ Sign Contract ]

> https://www.example.com

We agree that provider Bob Brown will perform translation services for consumer Charlie Clark for the following amount: 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. The contract is sealed when two parties sign the contract. After completion of work, both the provider and the consumer agree to release funds to the provider (the reward and the deposit). If a dispute arises, each of the parties may initiate dispute resolution. The mediator David Doe, if involved, will be entitled to 5 % of the reward. The mediator will resolve the conflict by splitting the funds, after taking the fee, between the consumer and the provider.

Provider (Bob Brown) deposited 0 Finney

Consumer (Charlie Clark) deposited 0 Finney

The state of the contract is "Pending".

Sign the contract. Transfer 110 Finney upon singing. [Sign Contract]

> https://www.example.com

We agree that provider Bob Brown will perform translation services for consumer Charlie Clark for the following amount: 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. The contract is sealed when two parties sign the contract. After completion of work, both the provider and the consumer agree to release funds to the provider (the reward and the deposit). If a dispute arises, each of the parties may initiate dispute resolution. The mediator David Doe, if involved, will be entitled to 5 % of the reward. The mediator will resolve the conflict by splitting the funds, after taking the fee, between the consumer and the provider.

— 702

Provider (Bob Brown) deposited 20 Finney — 708'

Consumer (Charlie Clark) deposited 0 Finney — 706

The state of the contract is "Pending". — 710

Revert signing and receive the submitted funds back — 804    802 [ Revert ]

800

FIG. 8 https://www.example.com

We agree that provider Bob Brown will perform translation services for consumer Charlie Clark for the following amount: 100 Finney. Upon signing the contract, the consumer transfers a refund amount of 10 Finney. The refund would be returned to the consumer after contract resolution. Upon signing the contract, the provider transfers a deposit of 20 Finney to be returned after contract resolution. The contract is sealed when two parties sign the contract. After completion of work, both the provider and the consumer agree to release funds to the provider (the reward and the deposit). If a dispute arises, each of the parties may initiate dispute resolution. The mediator David Doe, if involved, will be entitled to 5 % of the reward. The mediator will resolve the conflict by splitting the funds, after taking the fee, between the consumer and the provider.

702

Provider (Bob Brown) deposited 20 Finney — 708'

Consumer (Charlie Clark) deposited 0 Finney — 706

The state of the contract is "Pending". — 710

Sign the contract. Transfer 110 Finney upon singing. — 704'    712 [ Sign Contract ]

USER INTERFACE AND SMART CONTRACT INTERACTION MODEL FOR GENERATING USER INTERFACE REPRESENTATIONS

BACKGROUND

The gig economy is based on short-term and temporary jobs handled by contractors and other independent workers. Instead of hiring full-time staff, freelancers offer a concise way to accomplish a business goal without the massive overhead. Gig-based work lets freelancers exert greater freedom and control over their time and finances. Moreover, it forces independent workers to broaden their skill sets if they want to continue finding work.

As technology evolves, finding paid freelance work has become increasingly simple. With major platforms that centralize the marketplaces for new gigs, finding freelance work and workers is made easy. However, the current system is not without its flaws. High fees, lack of transparency, and sometimes restrictive policies that work against freelancers are problems inherent in the centralized gig marketplace.

Recently, the rise of blockchain has enabled a decentralized gig marketplace. The technology, which was created as the backbone for bitcoin, uses a mesh-like network of nodes to process transactions and operations, creating blocks of information that are appended together and tracked on a ledger that is updated simultaneously across every node.

This ledger is a major breakthrough, as it offers an incontrovertible and tamper-proof record of every transaction made on the chain, creating opportunities to track a variety of processes beyond simple payments. The blockchain's architecture does away with the current paradigm for data and systems management. Instead of keeping all the data related to products and services on a single server, blockchain-based systems spread this load, so no one point in the network can gate off information or alter data without being noticed.

Additionally, the ledger can be used with smart contracts, which offer automated, performance-based agreements that can be used to create new jobs, products and platforms. Smart contracts comprise code that run on the blockchain. They contain a set of rules under which parties to that smart contract agree to interact with each other. If and when the pre-defined rules are met, the agreement is automatically enforced. The smart contract code facilitates, verifies, and enforces the negotiation or performance of an agreement or transaction.

While smart contracts provide a very simple form of decentralized automation, creating such contracts and enabling users to perform actions with respect to smart contracts (e.g., via a user interface) typically requires a substantial coding effort to synchronize the user interface with the smart contract's state.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to provide a user interface for interacting with a smart contract deployed to a blockchain. The user interface is custom- generated for each party to the smart contract. In particular, representations of actions that a particular party is enabled to perform and/or has already taken with respect to the smart contract are provided to that party (e.g., via a user interface). The state of the smart contract may also be provided. A user experience generator queries the smart contract itself to determine which representations are to be provided to each party via his respective user interface. For instance, the smart contract may comprise functions and/or user experience (UX) annotations that indicate to the user experience generator which user interface representations should be provided to a particular user based on at least one of the identity of the party and a state in which the smart contract is in. Each time the state of the smart contract changes, the smart contract may provide an event notification to the user experience generator, which prompts the user experience generator to query the smart contract to determine the allowed actions for a particular user.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 7A is an example GUI screen in which user interface elements are displayed based on querying a smart contract on behalf of a service provider in accordance with an example embodiment.

FIG. 7B is an example GUI screen in which user interface elements are displayed based on querying a smart contract on behalf of a consumer in accordance with an example embodiment.

FIG. 8 is another example GUI screen in which user interface elements are displayed based on querying a smart contract on behalf of the service provider after the service provider has signed the smart contract.

FIG. 9 is yet another example GUI screen in which user interface elements are displayed based on querying a smart contract on behalf of the consumer after the service provider has signed the smart contract.

Figure 1:
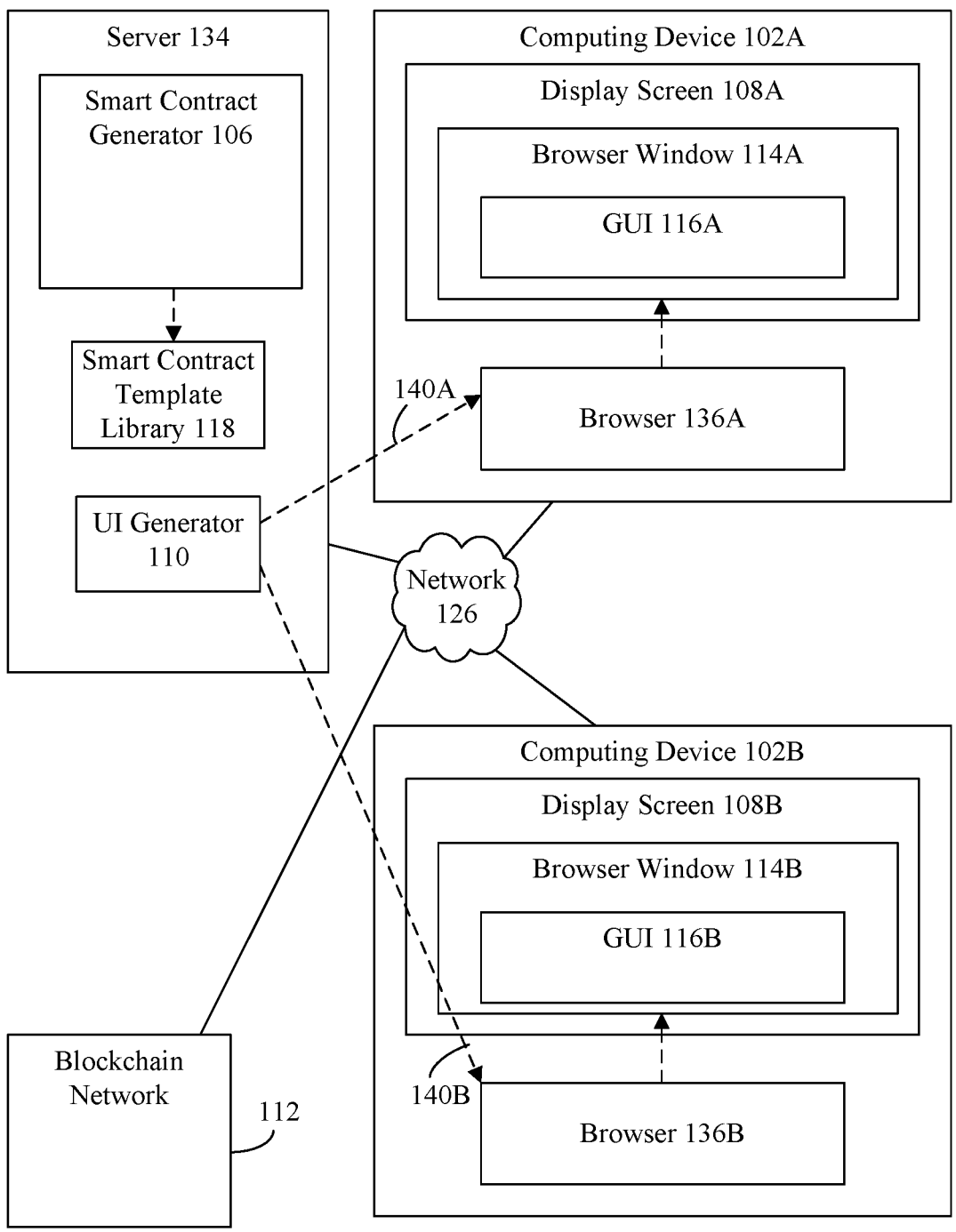
FIG. 1 shows a block diagram of a system for generating a smart contract in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein provide a user interface for interacting with a smart contract deployed to a blockchain. The user interface is custom-generated for each party to the smart contract. In particular, representations of actions that a particular party is enabled to perform and/or has already taken with respect to the smart contract are provided to that party (e.g., via a user interface). The state of the smart contract may also be provided. A user experience generator queries the smart contract itself to determine which representations are to be provided to each party via his respective user interface. For instance, the smart contract may comprise functions and/or user experience (UX) annotations that indicate to the user experience generator which user interface representations should be provided to a particular user based on at least one of the identity of the party and a state in which the smart contract is in. Each time the state of the smart contract changes, the smart contract may provide an event notification to the user experience generator, which prompts the user experience generator to query the smart contract to determine the allowed actions for a particular user.

By incorporating the functions and/or UX annotations within the smart contract itself, the user experience generator is not required to internally maintain a state machine that tracks the state of the smart contract. Instead, the user interface leverages the state maintained by the smart contract itself, and simply queries the smart contract to determine whether or not a particular action is allowable for a particular party to the smart contract whenever the state of the smart contract changes. This advantageously removes any state synchronization required between the user interface and the smart contract. As such, a user interface generation system is provided that is both very flexible and reliable. The user interface generated accurately reflects the state of the smart contract regardless of the complexity of the smart contract. Moreover, the functioning of computers on which the user experience generator executes is improved. In particular, processor cycles, memory, etc. of such computers are conserved as such computers do not need to maintain the state machine and process the state changes of the state machine. Instead, as described herein, the user experience generator simply queries the smart contract itself to determine its state. Moreover, because the manner in which user interface elements to be rendered are determined is greatly simplified, such user interface elements are rendered faster.

FIG. 1 shows a system 100 for generating a smart contract, according to an example embodiment. As shown in FIG. 1, system 100 includes a computing device 102A, a computing device 102B, a server 134, and a blockchain network 112. Server 134 includes a smart contract generator 106, a smart contract template library 118 (e.g., in storage), and a user interface (UI) generator 110. Computing device 102A includes a display screen 108A and a browser 136A, and computing device 102B includes a display screen 108B and a browser 136B. System 100 is described as follows. It is noted that while system 100 includes two computing devices 102A and 102B, system 100 may include any number of computing devices.

Computing devices 102A and 102B may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices. For example, server 124 may include a Web server, an application server, and/or a database.

Computing devices 102A and 102B and server 134 may each include at least one network interface that enables communications with each other over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Blockchain network 112 may comprise a decentralized, distributed blockchain computing platform maintained by a plurality of nodes (e.g., computing devices). Blockchain network 112 enables developers to build and execute decentralized applications, such as smart contracts, that run on blockchain technology. Any type of distributed ledger platform that offers smart contracts may be utilized for blockchain network 112. An example of blockchain network 112 includes, but is not limited to, Ethereum. Blockchain network 112 may be communicatively coupled to server 134 and/or computing devices 102A and 102B via network 126.

Smart contract generator 106 is configured to be operated/interacted with to create a smart contract between at least two users (e.g., a service provider and a consumer) that is configured to be executed on blockchain network 112. For instance, a first user (e.g., the service provider) may access smart contract generator 106 by interacting with an application at computing device 102A capable of accessing a network-based application, such as browser 136A, and a second user (e.g., the consumer) may access smart contract generator 106 by interacting with an application at computing device 102B capable of accessing a network-based application, such as browser 136B. The first user may use browser 136A to traverse a network address (e.g., a uniform resource locator) to smart contract generator 106, which invokes a GUI 116A (e.g., a web page) in a browser window 114A. Similarly, the second user may use browser 136B to traverse the network address to smart contract generator 106, which invokes GUI 116B in a browser window 114B. It is noted that any number of users may participate in creating a smart contract via smart contract generator 106.

UI generator 110 is configured to transmit GUI information 140A (e.g., one or more web pages, image content, user interface elements, code (e.g., JavaScript) etc.) to browser 136A to be displayed and/or executed as GUI 116A in browser window 114A of display screen 108A and transmit GUI information 140B to browser 136B to be displayed as GUI 116B in browser window 114B of display screen 108B. GUI 116A and GUI 116B may be interacted with by users to draft a smart contract. The smart contract may be based on a smart contract template selected by the user from a plurality of smart contract templates stored in smart contract template library 118, although the embodiments described herein are not so limited. Each of the smart contract templates may be stored as one or more files. For example, a first file may specify template language of the contract (e.g., various predetermined terms, conditions, clauses, etc.). The first file may be referred to as a definition file. Such template language may be formatted as a string. The definition file may also specify one or more variables corresponding to one or more terms of the smart contract that are user-specifiable via GUI 116A and 116B. Examples of such user-specifiable terms include, but are not limited to, a description of the goods to be provided (and the quantity therefor) and/or services to be rendered (and the date on which the services are to be rendered), the names of the parties of the contract (e.g., the name of the content provider, consumer, buyer, seller, etc.), payment terms, a mediator in an event of a dispute, etc. The definition file may be formatted in accordance with a JavaScript Object Notation (JSON) format, although the embodiments are not so limited. For example, the definition files may be formatted in accordance with an Extensible Markup Language (XML) format or any other format suitable for organizing and/or transmitting data.

A second file associated with a smart contract template may comprise the source code of the smart contract. The second file may be referred to as a source code file. The source code specifies a set of rules under which the parties to the smart contract agree to interact with each other. If and when the rules are met, the agreement is automatically enforced. The smart contract code facilitates, verifies, and enforces the negotiation or performance of the agreement. The source code may be written in a programming language suitable for compilation and execution by a virtual machine executing in blockchain network 112. For instance, in an embodiment in which blockchain network 112 is an Ethereum blockchain network, the source code may be written in the Solidity programming language, although the embodiments described herein are not so limited. The source code may reference the data and/or variables specified by the definition file. As will be described below, during deployment of the smart contract to blockchain network 112, the data and/or variables may be replaced by the values specified for such data and/or variables during smart contract generation and/or compilation. It is noted that the usage of a definition file and/or source code for each smart contract template is just one possible implementation and that any number of files may be used for any given smart contract template.

To render the selected contract template via GUI 116A and/or 116B, UI generator 110 may provide information 140A and 140B to GUI 116A and 116B, respectively, that causes GUI 116A and 116B to render the smart contract template in accordance with the associated definition file. For instance, the smart contract template terms may be displayed via GUI 116A and/or 116B as human-readable text, and the variables may be displayed as user-interactive elements (e.g., text boxes, pull-down menus, etc.) that enable the users to specify user-specifiable terms of the smart contract.

Figure 2:
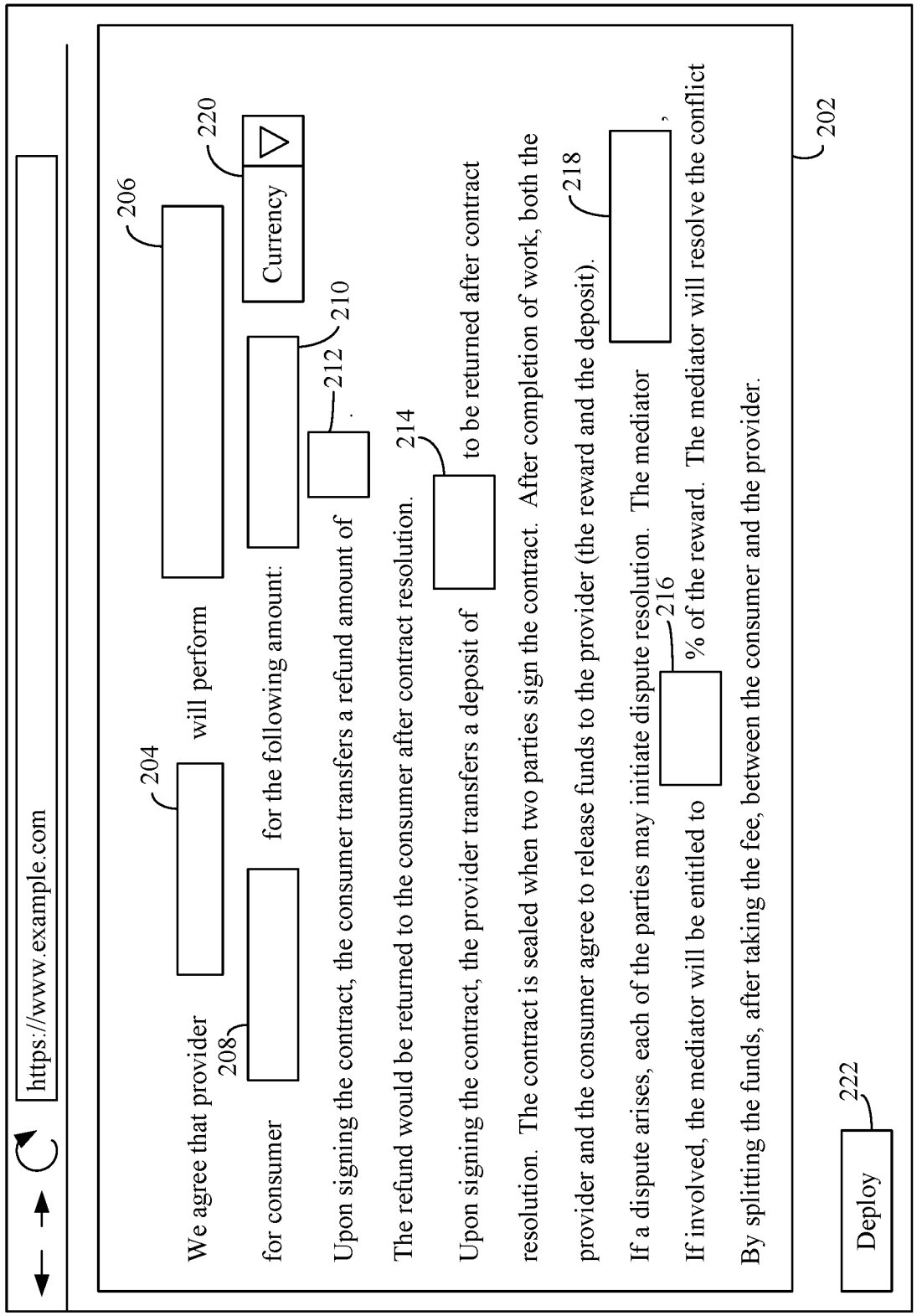
FIG. 2 is an example GUI screen that depicts a smart contract template in accordance with an embodiment.

Any number of users may be enabled to interact with contract generator 106 via their respective GUIs to cooperatively negotiate contract terms of the smart contract. For instance, users may be presented with a smart contract template, as selected by at least one of the users in their respective GUI (i.e., GUI 116A, smart contract generator 116B, etc.). For example, FIG. 2 is an example GUI screen 200 that depicts a smart contract template 202 in accordance with an embodiment. As shown in FIG. 2, a user, using a browser (e.g., browser 136A), has traversed to a network address (e.g., www.example.com) corresponding to smart contract generator 106 and has selected template contract 202. GUI 116A renders smart contract template 202 in browser window 114A in accordance with the smart contract template's associated definition file. The same smart contract template may be displayed for a second user that agreed to collaboratively draft a contract with the first user. For instance, the second user, using browser 136B may traverse to the network address corresponding to smart contract generator 106 and view smart template contract 202 via browser window 114B.

As shown in FIG. 2, smart contract template 202 comprises a human-readable text and a plurality of user interface elements 204, 206, 208, 210, 212, 214, 216, 218, and 220. The human-readable text represents template language in the associated definition file. Each of user interface elements 204, 206, 208, 210, 212, 214, 216, 218, and 220 represents a variable in the definition file. Each of user interface elements 204, 206, 208, 210, 212, 214, 216, and 218 may be text boxes that enable a user to specify certain terms of the contract. For example, user interface element 204 enables a user to specify the name of the provider, user interface element 206 enables a user to specify the type of service to be rendered, user interface 208 enables a user to specify the name of the consumer, user interface element 210 enables a user to specify the amount of funds to be paid to the provider, user interface element 212 enables a user specify the a refund amount to be paid by the consumer, user interface element 214 enables a user to specify a deposit amount to be paid by the provider, user interface element 216 enables a user to specify a percentage of the reward that a mediator is given upon dispute resolution, and user interface element 218 enables a user to specify the name of the mediator. User interface element 220 may be a pulldown menu that enables a user to specify the type of currency to be used for the payment amount (e.g., cryptocurrency (or a unit thereof) supported by blockchain network 112). It is noted that the usage of text boxes for user interface elements 204, 206, 208, 210, 212, 214, 216, 218 and the usage of a pulldown menu for user interface 220 is purely exemplary and that other types of user interface elements may be utilized to enable a user to specify contract terms.

Users may collaboratively fill out smart contract template 202 via a communication session (e.g., via phone, chat, video chat, etc.), where each user is enabled to specify the terms of smart contract template 202 based on the conversation between the users. When a particular user makes a modification to a contract term, the modification is also reflected on the other users' respective GUI. For instance, if a first user specifies a provider name via user interface 204 using GUI 116A, UI generator 110 provides the specified provider name to the second user's GUI (e.g., GUI 116B), which is updated to reflect the specified value.

After the users finalize the terms of the smart contract, the smart contract may be deployed to blockchain network 112 for execution thereby. For instance, a user may interact with a user interface element 222, which, when activated, deploys the finalized contract to blockchain network 112.

Figure 3:
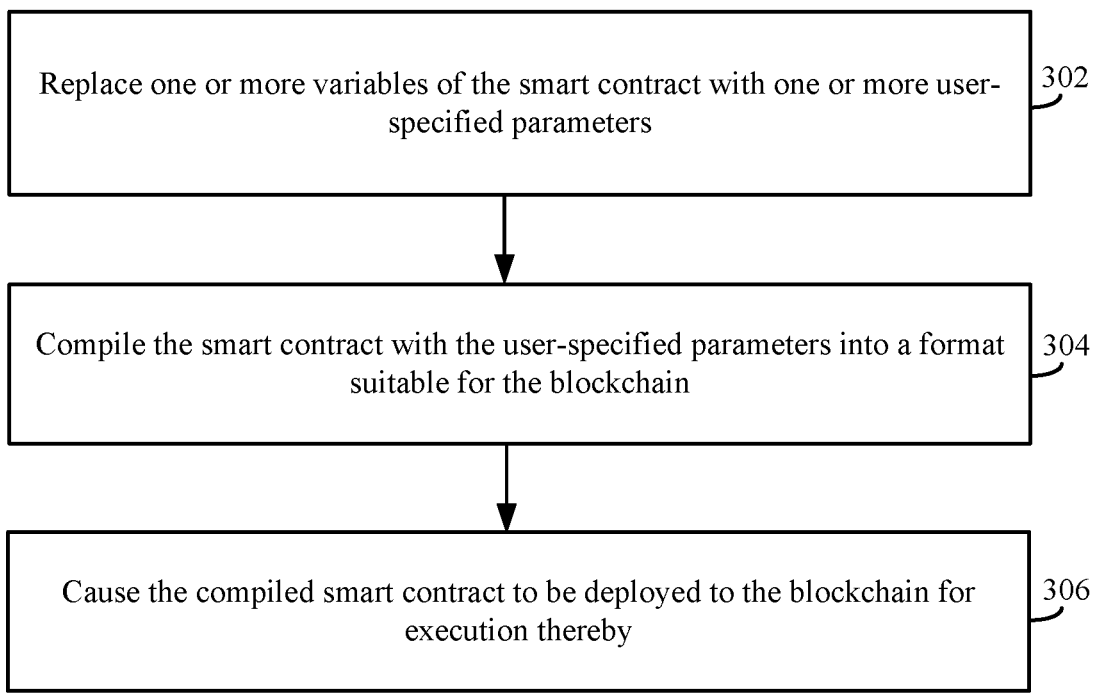
FIG. 3 shows a flowchart of a method for deploying a smart contract to a blockchain maintained by a computing platform in accordance with an example embodiment.
Figure 4:
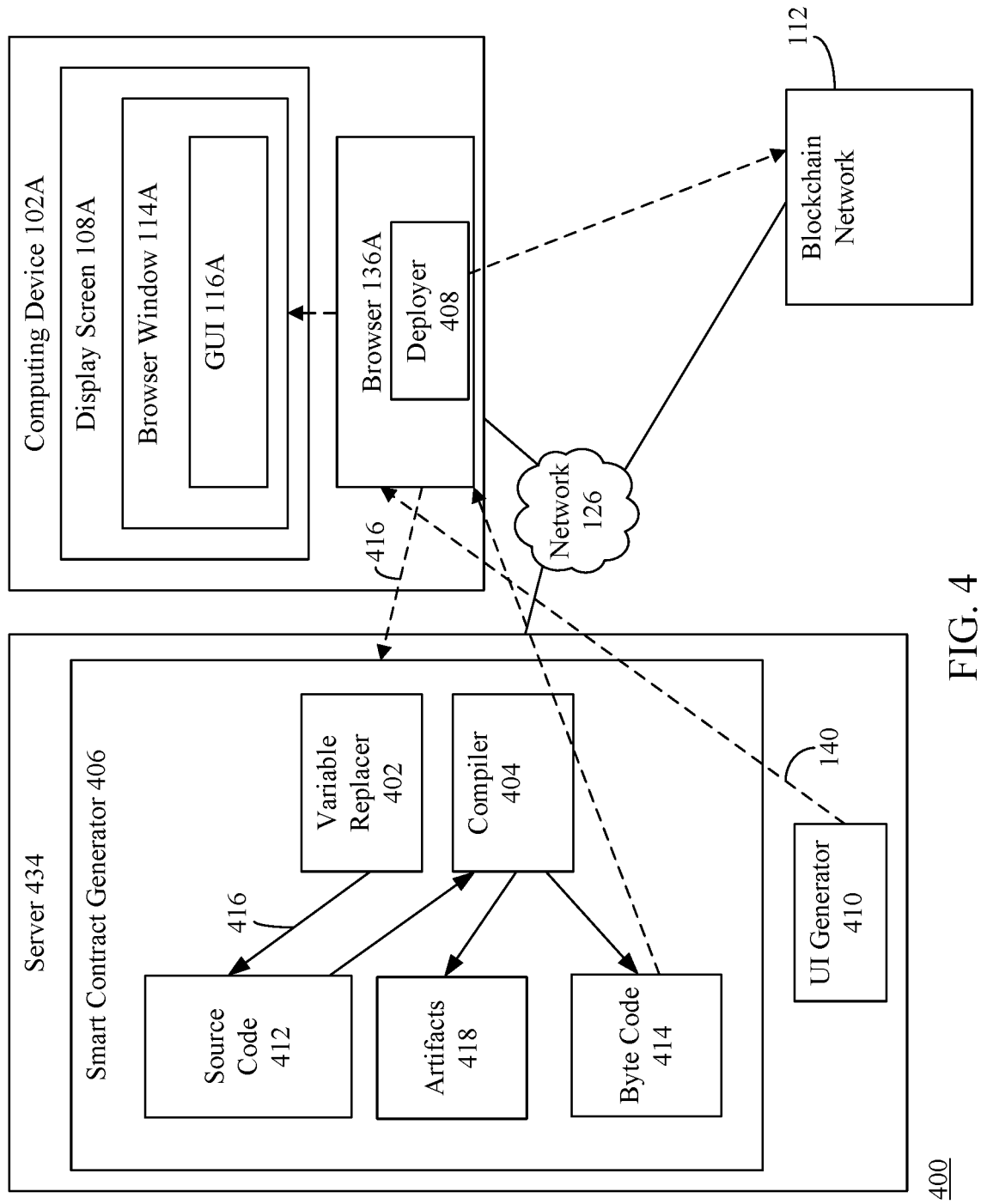
FIG. 4 shows a block diagram of a system for deploying a smart contract to a blockchain maintained by a computing platform in accordance with an example embodiment.

FIG. 3 shows a flowchart 300 of a method for deploying a smart contract to a blockchain maintained by a computing platform in accordance with an example embodiment. In an embodiment, flowchart 300 may be implemented by a system 400 shown in FIG. 4, although the method is not limited to that implementation. FIG. 4 shows a block diagram of system 400 for deploying a smart contract to a blockchain maintained by a computing platform in accordance with an example embodiment. System 400 is an example of system 100, as described above with reference to FIG. 1. As shown in FIG. 4, system 400 comprises a server 434, which is an example of server 134. System 400 further includes, computing device 102A and blockchain network 112, as described above with reference to FIG. 1. Computing device 102B is not shown for brevity. Server 434, computing device 102A and blockchain network 112 are communicatively coupled via network 126. Network 426 is an example of network 126, as described above with reference to FIG. 1. As further shown in FIG. 4, server 434 comprises a smart contract generator 406 and a UI generator 410. Smart contract generator 406 comprises a variable replacer 402 and a compiler 404. As also shown in FIG. 4, browser 136A is configured to execute a deployer 408. Smart contract generator 406 and UI generator 410 are examples of contract generator 106 and UI generator 110, as described above with reference to FIG. 1. Other structural and operational embodiments will be apparent to persons skilled in the relevant art(s) based on the discussion regarding flowchart 300 and system 400 of FIG. 4.

Flowchart 300 begins with step 302. In step 302, variable (s) of the smart contract are replaced with one or more user-specified parameters. For example, with reference to FIG. 4, after the user-specified parameters of the smart contract being negotiated are finalized via smart content generator GUI 116A, the user-specified terms (shown as user-specified parameters 416) are provided to smart contract generator 106 via browser 136A. Variable replacer 402 of smart contract generator 406 may be configured to replace the variables in the smart contract source code file (shown as source file 412) associated with the smart contract template with user-specified parameters 416.

In step 304, the contract is compiled with the user-specified parameters into a format suitable for the blockchain. For example, with reference to FIG. 4, compiler 404 may be configured to compile source code file 412 with the user-specified parameters 416 into a format suitable for the blockchain maintained by blockchain network 112. For instance, compiler 404 may compile source code file 412 into byte code 414. In an embodiment in which source code file 412 is written in the Solidity programming language, compiler 404 may be a Solidity-based compiler. In an embodiment in which blockchain network 112 is an Ethereum blockchain network, byte code 414 may be Ethereum Virtual Machine (EVM) byte code. The compilation process may also generate a compilation artifacts file 418. Compilation artifacts file 418 may comprise a description of smart contract methods and UX annotations included in the smart contract (which are further described below with reference to FIG. 6). Compilation artifacts file 418 may be stored in storage (e.g., a database) communicatively coupled to server 434. Compilation artifacts file 418 may be formatted in accordance with the JSON format; however, the embodiments described herein are not so limited.

In step 306, the compiled smart contract is caused to be deployed to the blockchain for execution thereby. For example, with reference to FIG. 4, smart contract generator 406 may provide byte code 414 to browser 136A. Deployer 408 executing in browser 136A may be configured to deploy the compiled smart contract (e.g., byte code 414) to the blockchain maintained by blockchain network 112 for execution thereby. For instance, a virtual machine (e.g., an Ethereum virtual machine (EVM) of blockchain network 112) may execute byte code 414. Smart contract generator 406 may provide byte code 414 to browser 136A via network 126 using an application programming interface (API), such as, but not limited to a Representational State Transfer (REST) API. Deployer 408 may provide byte code 414 to blockchain network 112 via network 126 using an API, such as a Metamask API.

Figure 5:
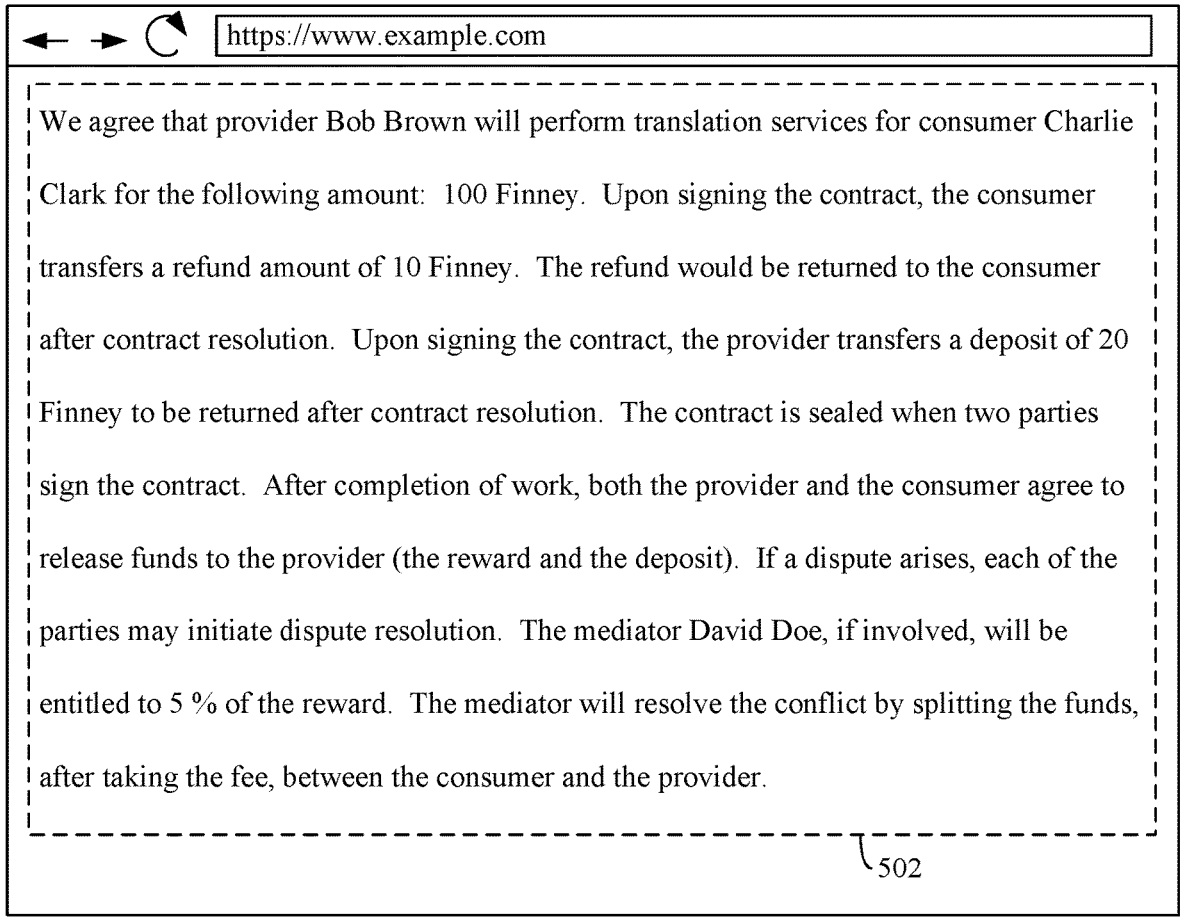
FIG. 5 shows an example GUI screen in which an immutable version of an agreed upon smart contract is shown in accordance with an example embodiment.

After the smart contract has been deployed to blockchain network 112, the smart contract becomes immutable (i.e., the contract language and contract terms are no longer editable and are read-only). In accordance with an embodiment, the immutable version of the smart contract (shown as text 502) is displayed to all the parties to the smart contract (e.g., via GUI 116A, GUI 116B, etc.). For example, FIG. 5 shows an example GUI screen 500 in which an immutable version of the agreed upon smart contract is shown. As shown in FIG. 5, user interface elements 204, 206, 208, 210, 212, 214, 216, 218, and 220 (shown in FIG. 2) are no longer displayed. Instead, the parameters specified by a user for each of user interface elements 204, 206, 208, 210, 212, 214, 216, 218, and 220 are displayed in placed thereof, and a noneditable, finalized version of the smart contract is shown.

In accordance with an embodiment, certain user interface representations may be generated and presented to the user after the smart contract is deployed to blockchain network 112 that provides a status with respect to the smart contract and/or enable an action to be taken with respect to the smart contract. Such actions include, but are not limited to, depositing funds, withdrawing funds, executing the smart contract, initiating a dispute, etc. The user interface elements that are displayed may vary depending on the user viewing the smart contract and/or the state in which the smart contract is in. The foregoing techniques are described below.

Figure 6:
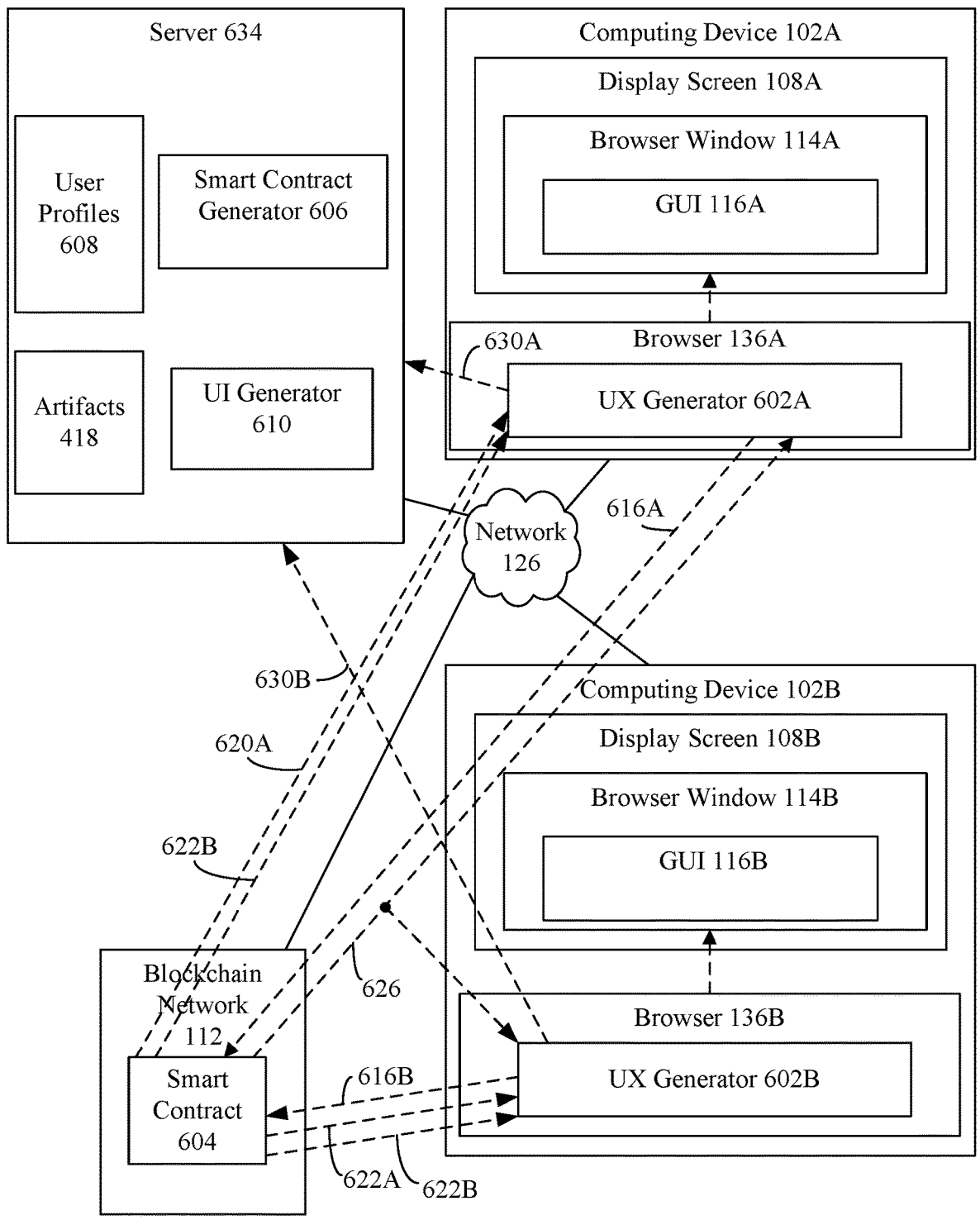
FIG. 6 shows a block diagram of system for presenting a user interface representation of an action a user is enabled to take with respect to a smart contract in accordance with an example embodiment.

For instance, FIG. 6 shows a block diagram of system 600 for presenting a user interface representation of an action a user is enabled to take with respect to the smart contract in accordance with an example embodiment. System 600 is an example of system 100, as described above with reference to FIG. 1, and system 400, as described above with reference to FIG. 4. As shown in FIG. 6, system 600 comprises a server 634, which is an example of server 134, as described above with reference to FIG. 1, and server 434, as described above with reference to FIG. 4. System 600 also includes computing device 102A, computing device 102B and blockchain network 112, as described above with reference to FIGS. 1 and 4. Server 634, computing device 102A, computing device 102, and blockchain network 112 are communicatively coupled via a network 126. As further shown in FIG. 6, server 634 comprises a smart contract generator 606, which is an example of smart contract generator 106 and smart contract generator 406, as respectively described above with reference to FIGS. 1 and 4, and a UI generator 610, which is an example of UI generator 110 and 410, as described above with reference to FIGS. 1 and 4. As further shown in FIG. 6, a smart contract 604 is deployed to blockchain network 112 (in accordance with the description provided above with reference to FIGS. 3 and 4). For instance, smart contract 604 may correspond to byte code 414 described above with reference to FIG. 4. As also shown in FIG. 6, a UX generator 602A is shown executing in browser 136A and a UX generator 602B is shown executing in browser 136B.

UX generator 602A and 602B may be configured to determine which UI elements are to be presented to different users of smart contract generator 606 (e.g., via GUI 116A and GUI 116B, respectively). UX generator 602 may determine the UI elements to be presented based on a state in which smart contract 604 is in and/or the identity of the user viewing smart contract 604.

The state in which smart contract 604 is in may be determined based on event notifications that are provided by smart contract 604 to UX generator 602A and/or 602B. For instance, each time an event occurs with respect to smart contract 604, smart contract 604 may provide an event notification 626 to UX generator 602A and 602B that identifies that an event has occurred (e.g., a state change has occurred, a user has signed smart contract 604, a user has deposited funds associated with smart contract 604, etc.). Examples of states include, but are not limited to a pending state, a sealed state, a disputed state, or a completed state. Smart contract 604 is in a pending state when at least one of the parties to smart contract 604 has not signed smart contract 604. Smart contract 604 is in a sealed state after each of the parties to smart contract 604 have signed smart contract 604. Smart contract 604 is in a disputed state when at least one of the parties have initiated a dispute with respect to smart contract 604. Smart contract 604 is in a completed state after all the obligations and/or duties of each party to smart contract 604 is completed. It is noted that that the states described above are purely exemplary and that smart contract 604 may comprise any number and/or types of states.

UX generator 602A and/or 602B may determine the identity of the user based on a user profile associated with the user. For instance, server 634 may maintain user profiles 608 for different users that utilize smart contract generator 606. A user may be required to login to a website that provides smart contract generator 606, for example, using a username and/or password. Smart contract generator 606 may maintain the login information when a user logs into the website and may associate the login information with the user's profile. The user profile may include information associated with the user (e.g., name, address, interests, Ethereum ID, etc.). UX generator 602A and/or 602B may access the user's profile upon the user logging into the website and determine the identity of the user based on the information included in that user's profile. Alternatively, browser 136A may store an identifier (e.g., a username) that identifies the user utilizing GUI 116A, and browser 136B may store an identifier that identifies the user utilizing GUI 116B. UX generator 602A may provide a query to browser 136A and UX generator 602A may provide a query to browser 136B and obtain the user identifier therefrom.

The code of smart contract 604 may comprise functions (e.g., procedures or methods) that, when executed perform a particular action with respect to the smart contract. Such actions include, but are not limited to, depositing funds, withdrawing funds, executing the smart contract, initiating a dispute, etc. Such functions may be referred to as smart contract methods. Some actions may change the state of the smart contract 604, while other actions may not. Smart contract 604 may also comprise functions that return information pertaining to smart contract 604 (e.g., the amount of funds deposited by a particular user at a particular stage of smart contract 604, etc.).

Each of the smart contract methods may be associated with a complimentary function that is also included in the code. Each complimentary function may be utilized by UX generator 602A and/or 602B to determine whether or not a user interface element associated with the action of its corresponding smart contract method is to be provided to a particular user, thereby enabling that user to perform that action. For instance, when coding smart contract 604 (e.g., using the Solidity language), the programmer may code a complimentary function for each smart contract method. Each complimentary function may be configured to receive at least the state of the smart contract and/or the identity of the user as inputs. Each complimentary function may further specify one or more condition(s) that are required for the user interface element to be provided to the user smart contract method to be called (e.g., the contract must be in a signed state and the identity of the user must either be a service provider and/or a consumer).

Upon receiving event notification 626 from smart contract 604 during the execution thereof, UX generator 602A and 602B may query server 634 for information stored via compilation artifacts file 418 to obtain a description of each of the smart contract method calls, the complimentary smart contract method calls and/or the UX annotations associated with smart contract 604. For instance, UX generator 602A may provide a query 630A to server 634 for information stored via compilation artifacts file 418, and UX generator 602B may provide a query 630B to server 634 for information stored via compilation artifacts file 418. In response, server 634 may provide a listing of the smart contract methods, complimentary smart contract methods, and/or UX annotations included in smart contract 604 to UX generator 602A and/or 602B.

Using the listing, UX generator 602A and 602B may query each complimentary function via one or more queries 616A and 616B, respectively, on behalf each user associated with smart contract 604 to determine whether a corresponding UI element should be provided to the user. For instance, when querying smart contract 604 on behalf of a first user, query 616A may include an identifier of the first user. When querying smart contract 604 on behalf of a second user, query 616B may include an identifier of the second user. If the condition(s) of a particular complimentary function are met, the complimentary function returns a positive response 620A and/or 620B to UX generator 602A and/or 602B, respectively, that indicates that a corresponding user interface element with respect to the associated smart contract method should be provided to the user. In response, UX generator 602A provides a representation of the user interface element to GUI 116A via browser 136A and/or UX generator 602B provides a representation of the user interface element to GUI 116B via browser 136B for displaying thereby. If the condition(s) are not met, the complimentary function returns a negative response 622A and/or 622B to UX generator 602A and/or UX generator 602A, respectively, that indicates that no user interface element should be provided to the user with respect to the associated smart contract method. The user interface element may be a user-interactive element, such as a button, that is displayed via GUI 116A and/or contact generator GUI 116B.

UX generator 602A and/or UX generator 602B may also be configured to display other types of user-interface elements. For example, UX generator 602A and/or UX generator 602B may be configured to display a text string that, for example, provides a status update with reference to an action taken with respect to smart contract 604 (e.g., the state of smart contract 604, the amount of funds deposited by a particular user, etc.). The text string may be based on an annotation included in the code of smart contract 604. Such annotations may be referred to as user experience (UX) annotations, as they affect the user interface (e.g., GUI 116A and/or GUI 116B) utilized by the user. The annotation may be included in the code by a programmer. The annotations may be appear as comments to the compiler that compiles the source code of smart contract 604 (e.g., compiler 404, as shown in FIG. 4). UX annotations may comprise a textual string. UX annotations may also comprise one or more variables utilized by smart contract 604 and that are populated during execution of smart contract 604. The variables may be representative of user identities, fund amounts, etc. UX generator 602A and/or 602B may be configured to utilize such UX annotations to generate user interface elements (e.g., text strings). The UX annotations may be associated with complimentary functions for both smart contract methods that enable a user to perform an action with respect to smart contract 604 and smart contract methods that return information pertaining to smart contract 604. For instance, such UX annotations may be included within such complimentary functions or included proximate to such complimentary functions (e.g., located before after such complimentary functions). Compilation artifacts file 418 may indicate which UX annotations are associated with a particular complimentary function. If a complimentary function provides a positive response, UX generator 602A and/or 602B may utilize the information received for compilation artifacts file 418 to determine which UX annotations are associated with the complimentary functions that provided positive response 620A and/or 620B. UX generator 602A and/or 602B may display the associated UX annotations as a text string. Any variables included in such UX annotations are replaced by the values for such variables, as determined by smart contract 604.

Certain UX annotations may be provided in the code of smart contract 604 that are independent of a complimentary function. For instance, certain UX annotations may provide the current state of smart contract 604. Such UX annotations may also be specified via compilation artifacts file 418. Each time smart contract 604 provides an event notification (e.g., event notification 626A and/or 626B), UX generator 602A and/or 602B may display such UX annotations as a text string utilizing the information received for compilation artifacts file 418. Any variables included in such UX annotations are replaced by the values for such variables, as determined by smart contract 604.

Because certain user interface elements may be conditioned based on the identity of the user, the user interface generated may differ from user to user for any given smart contract. Moreover, because certain user interface elements may be conditioned on the state of the smart contract, the user interface generated may dynamically change when the state of smart contract changes. For example, suppose a service provider named in smart contract 604 utilizes computing device 102A to view and/or interact with a representation of smart contract 604 via GUI 116A, and a consumer named in smart contract 604 utilizes computing device 102B to view and/or interact with a representation of smart contract via GUI 116B. After smart contract 604 is deployed, UX generator 602A and/or 602B may query each complimentary function via one or more queries 616A and/or 616B, respectively, and/or query server 634 (via queries 630A and/or 630B, respectively) to determine whether a user interface element associated with each complimentary function is to be rendered via GUI 116A and/or GUI 116A and/or to determine whether any UX annotations are to be displayed via a text string to be rendered via GUI 116A and/or GUI 116A.

At this stage, smart contract 604 is in the pending state, as neither content provider nor consumer have signed the contract. Accordingly, the complimentary functions associated with smart contract methods for executing (i.e., signing) the contract may return a positive result and cause a user interface element to be rendered on both of GUI 116A and GUI 116A. For example, FIG. 7A is an example GUI screen 700A in which user interface elements are displayed to a service provider based on querying smart contract 604 on behalf of the service provider in accordance with an example embodiment, and FIG. 7B is an example GUI screen 700B in which user interface elements are displayed to a consumer based on querying smart contract 604 on behalf of the consumer in accordance with an example embodiment. As shown in FIGS. 7A and 7B, text 702 representing an immutable version of a smart contract 604 is provided via a GUI (e.g., GUI 116A and GUI 116B).

In FIG. 7A, below text 702 are various interface elements 704, 706, 708, 710, and 712 that are displayed based on querying smart contract 604 on behalf of the service provider. For instance, after deploying smart contract 604 to blockchain network 112, smart contract 604 may provide event notification 626 to UX generator 602A that indicates that smart contract 604 has changed state (i.e., smart contract 604 is in a pending state). In response, UX generator 602A may query each of the complimentary functions of smart contract 604 on behalf of the service provider of smart contract 604. In the example shown in FIG. 7, a first complimentary function associated with a smart contract method for signing the smart contract and a second complimentary function associated with a smart contract method associated with depositing funds may all provide a positive result. Accordingly, user interface elements 704, 706, and 712 are displayed. For example, the conditions for displaying user interface elements 704 and 712 may be that smart contract 604 is in a pending state and the identity of the user (as indicated in the query to smart contract 604) is a service provider associated with smart contract 604. The conditions for displaying user interface elements 706 and 708 may be that smart contract 604 is in a pending state, the identity of the user is a service provider or a consumer, and that the service provider and the consumer have not deposited funds.

User interface elements 704, 706, and 708 are text strings corresponding to UX annotations included in the code of smart contract 604 and/or compilation artifacts file 418, and user interface element 712 is a button. The UX annotation represented by user interface element 704 may include a variable representative of the amount that the service provider is to deposit with respect to smart contract 604. Variable is populated by a value specified by the parties during smart contract negotiation. In the example shown in FIG. 7, because smart contract 604 is queried on behalf of the service provider, the value "20" populates the variable, as it represents the amount that the service provider is to deposit at the time of signing. User interface element 710 may be a UX annotation that is independent of a complimentary function. User interface element 710 may be displayed as a result of UX generator 602A and/or 602B analyzing the information received for compilation artifacts file 418. For instance, the information may specify that the UX annotation is to be responsive to receiving displayed regardless of any complimentary function returning a positive response.

In FIG. 7B, below text 702 are interface elements 704', 706, 708, 710, and 712 that are displayed based on querying smart contract 604 on behalf of the consumer. For instance, after deploying smart contract 604 to blockchain network 112, smart contract 604 may provide event notification 626 to UX generator 602B that indicates that smart contract 604 has changed state (i.e., smart contract 604 is in a pending state). In response, UX generator 602B may query each of the complimentary functions of smart contract 604 on behalf of the consumer of smart contract 604. In the example shown in FIG. 7B, the same complimentary functions described above with reference to FIG. 7A provide a positive result. Accordingly, user interface elements 706 and 712 are displayed. User interface element 710 is displayed in a similar manner as described above with reference to FIG. 7A. However, with reference to user element interface 704,' because the first complimentary function is queried on behalf of the consumer, the variable included in the UX annotation is populated by the agreed-upon amount that the consumer is to deposit upon signing the contract (i.e., "110 Finney").

Referring again to FIG. 6, now suppose that the service provider signs smart contract 604 by activating user interface element 712 of FIG. 7A (e.g., by pressing user interface element 712 via an input device, such as a mouse). Upon activating user interface element 712, GUI 116A may send a command to UX generator 602A via browser 136A that causes UX generator 602A to call the smart contract method for signing smart contract 604. After smart contract 604 is successfully signed by the service provider and/or the required funds are deposited, smart contract 604 may provide event notification 626 to UX generator 602A that indicates smart contract 604 has been signed by a party. In response, UX generator 602A queries each of the complimentary functions of smart contract 604 via one or more queries 616 (as specified in the information associated with compilation artifacts file 418) to determine which actions that the service provider and the consumer are allowed to perform and the user interface elements corresponding to such actions that are to be provided to the users. The GUI provided to service provider will differ from the GUI provided to consumer. In particular, user interface elements 704 and 712 will no longer be provided to the service provider (via GUI 116A), as he has already signed the contract. However, user interface elements 704 and 712 will still be provided to the consumer's GUI (e.g., GUI 116B) because he has not yet signed the contract. Examples of such GUI screens are provided below with reference to FIGS. 8 and 9.

For example, FIG. 8 is an example GUI screen 800 in which user interface elements are displayed based on querying smart contract 604 on behalf of the service provider after the service provider has signed smart contract 604 in accordance with an example embodiment. FIG. 9 is an example GUI screen 900 in which user interface elements are displayed based on querying smart contract 604 on behalf of the consumer after the service provider has signed smart contract 604 in accordance with an example embodiment. As shown in FIG. 8, when smart contract 604 is queried on behalf of the service provider, user interfaced elements 704 and 712 are no longer displayed as the conditions for displaying are no longer met (i.e., service provider has signed smart contract 604). Moreover, user interface element 708 has been updated to reflect the amount of funds deposited by the service provider (shown as user interface element 708). Finally, new user interface element 802 and 804 are displayed. User interface 802 may be a button that enables the service provider to revert the signing and receive his funds back. User interface element 804 provides a text description of the functionality provided by user interface element 802. User interface elements 802 and 804 may be displayed upon a corresponding complimentary function associated with a smart contract method for reverting the signing returning a positive result. User interface element 804 may be displayed based on a UX annotation included in the code of smart contract 604 and/or compilation artifacts file 418 that is associated with a smart contract method for reverting smart contract 604.

As shown in FIG. 9, user interface elements 704' and 712 are still displayed for the consumer, as he has yet to sign the contract (i.e., the condition required for not displaying user interface element 712 has not been met). Moreover, user interface element 708 has been updated (shown as user interface element 708') to reflect the amount of funds deposited by the service provider.

The user interface elements presented to the service provider and consumer (and/or other parties to the smart contract, such as a mediator) continue to change through all the different phases of the smart contract depending on the actions taken by the parties and/or the state in which smart contract 604 is in.

UX generator 602A and/or 602B may be configured to provide query(ies) 616A and/or 616B and/or receive event notification 626, positive response 620A and/or 620B and/or negative response 622A and/or 622B via an API that interfaces blockchain network 112 and UX generator 602A and/or 602B. In an embodiment in which blockchain network 112 is an Ethereum-based, the API may be a Metamask API. UX generator 602A and/or 602B may be configured to provide query(ies) 630A and/or 630B to server 634 via a REST API.

Figure 10:
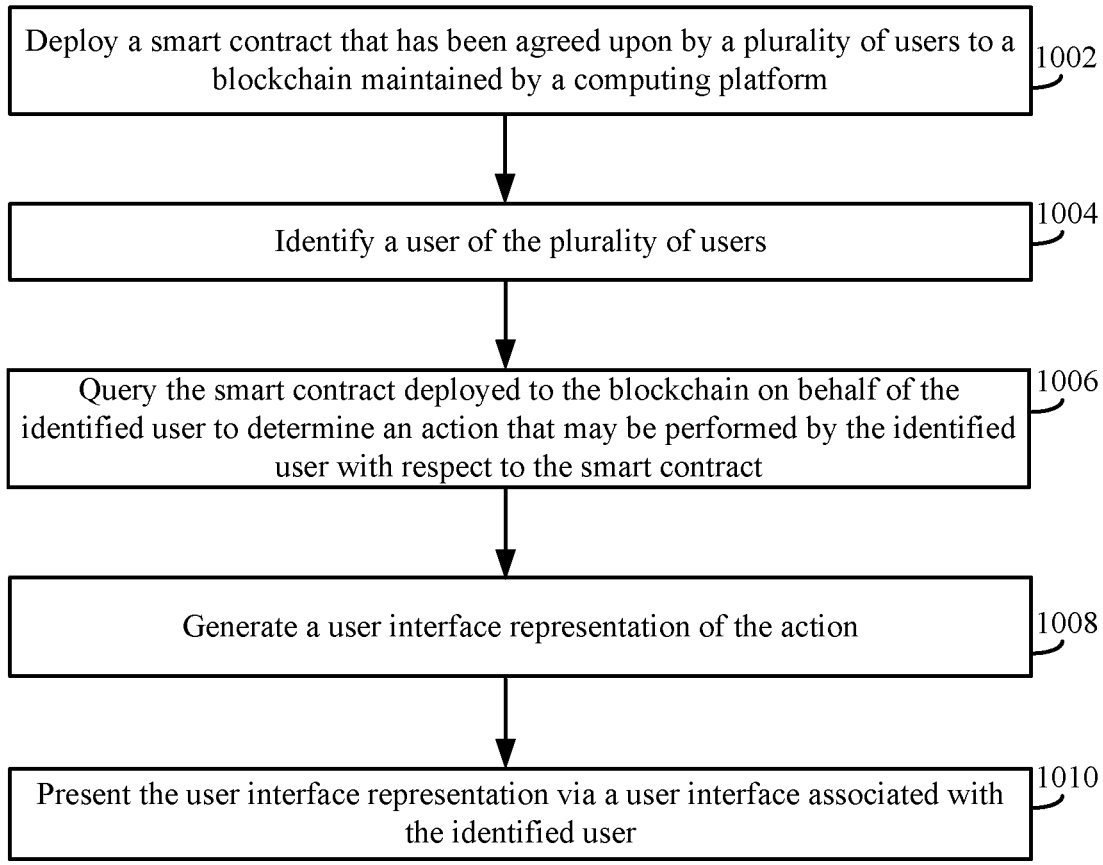
FIG. 10 shows a flowchart of a method for presenting a user interface representation of an action a user is enabled to take with respect to a smart contract in accordance with an example embodiment.

FIG. 10 shows a flowchart 1000 of a method for presenting a user interface representation of an action a user is enabled to take with respect to the smart contract in accordance with an example embodiment. In an embodiment, flowchart 1000 may be implemented by system 600 shown in FIG. 6, although the method is not limited to that implementation. Accordingly, flowchart 1000 will be described with continued reference to FIG. 6. Other structural and operational embodiments will be apparent to persons skilled in the relevant art(s) based on the discussion regarding flowchart 1000 and system 600 of FIG. 6.

Flowchart 1000 begins with step 1002. In step 1002, a smart contract that has been agreed upon by a plurality of users is deployed to a blockchain maintained by a computing platform. For example, with reference to FIG. 6, browser 136A deploys smart contract 604 to blockchain network 112 (e.g., via deployer 408, as shown in FIG. 4). Smart contract 604 may be deployed in accordance with flowchart 300 and system 400, as described above with reference to FIGS. 3 and 4.

At step 1004, a user of the plurality of users is identified. For example, with reference to FIG. 6, when a first user accesses smart contract generator 606 and/or interacts with GUI 116A via browser 136A, browser 136A may access a user profile of user profiles 608 associated with the user to identify the user. Similar, when a second user accesses smart contract generator 606B and/or interacts with GUI 116A via browser 136B, browser 136B may access a user profile of user profiles 608 associated with the user to identify the user.

At step 1006, the smart contract deployed to the blockchain is queried on behalf of the identified user to determine an action that may be performed by the identified user with respect to the smart contract. For example, with reference to FIG. 6, UX generator 602A may provide a query 616A to smart contract 604 deployed to blockchain network 112 on behalf of the identified user to determine an action that may be performed by the identified user with respect to smart contract 604. Query 616A may include an identifier that identifies the user. Such actions include but are not limited to, signing the contract, depositing funds, withdrawing funds, initiation a dispute, etc. Additional details regarding querying smart contract 604 are described below with reference to FIG. 11.

At step 1008, a user interface representation of the action is generated. For example, with reference to FIG. 6, UX generator 602A may generate a representation of the action and provide the representation to GUI 116A.

At step 1010, the user interface representation is presented via a user interface associated with the identified user. For example, with reference to FIG. 6, GUI 116A may render the representation.

It is noted that steps 1004, 1006, 1008, and/or 1010 may occur each time an event notification (i.e., event notification 626) is received from smart contract 604. Additional details regarding event notification 626 are described below with reference to FIG. 11.

Figure 11:
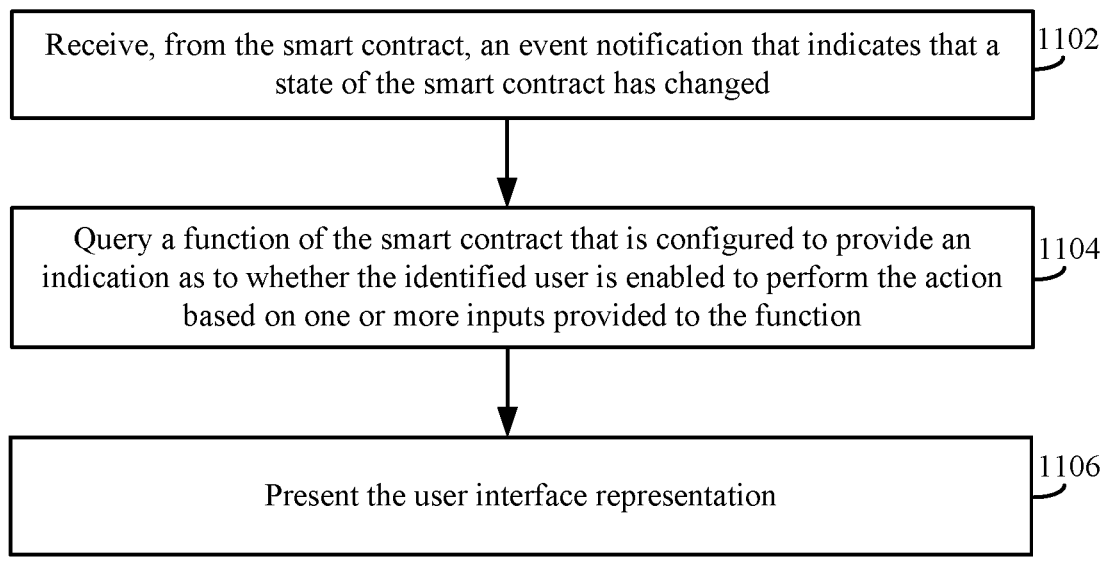
FIG. 11 shows a flowchart of a method for querying a smart contract and presenting a representation of a user interface in accordance with an example embodiment.

FIG. 11 shows a flowchart 1100 of a method for querying a smart contract and presenting a representation of a user interface in accordance with an example embodiment. In an embodiment, flowchart 1100 may be implemented by system 600 shown in FIG. 6, although the method is not limited to that implementation. Accordingly, flowchart 1100 will be described with continued reference to FIG. 6. Other structural and operational embodiments will be apparent to persons skilled in the relevant art(s) based on the discussion regarding flowchart 1100 and system 600 of FIG. 6.

Flowchart 1100 begins with step 1102. In step 1102, an event notification is received from the smart contract that indicates that a state of the smart contract has changed. For example, with reference to FIG. 6, UX generator 602A may receive event notification 626 from smart contract 604 when the state of smart contract 604 changes.

In step 1104, a function of the smart contract that is configured to provide an indication as to whether the identified user is enabled to perform the action based on one or more inputs provided the function is queried. For example, with reference to FIG. 6, UX generator 602A may provide query 616A to a function (e.g., a complimentary function) of smart contract 604. The function is configured to provide positive indication 620A if the user is enabled to perform the action and configured to provide negative indication 622A if the user is not enabled to perform the action.

In accordance with one or more embodiments, the function queried is determined based on an artifacts file (e.g., compilation artifacts file 418) that specifies a plurality of functions associated with the smart contract, the artifacts file being generated during compilation of the smart contract.

In one or more embodiments, the one or more inputs comprise at least one of the state of the smart contract or an identifier of the identified user.

In step 1106, responsive to the indication indicating that the identified user is enabled to perform the action, the user interface representation is presented. For example, with reference to FIG. 6, responsive to receiving positive indication 622A, UX generator 602A provides the representation to GUI 116A, which renders the representation.

In accordance with one or more embodiments, the user interface representation is a text string or a button.

In accordance with one or more embodiments, the user interface representation may be a message (e.g., an email message, a text message, a short messaging service (SMS) message, and/or the like), that is provided to a computing device (e.g., a smart phone, a tablet, a computer, a laptop, etc.) associated with the user. In accordance with one or more other embodiments, the user interface representation may be audio or voice notification that is played back via a speaker of a virtual assistant of a smart speaker, such as, but not limited to, Amazon Echo, Google Home, etc.

In accordance with one or more embodiments, the text string is based on an annotation associated with the function of the smart contract.

III. Additional Example Embodiments

It is noted that while the embodiments described above describe that users may negotiate and generate a smart contract via a smart contract template, the embodiments described herein are not so limited. For instance, in an embodiment, the language and/or terms of the smart contract may be generated based on a communication session via a plurality of different users. For instance, users may engage in a chat session via a website (e.g., a social media-based website, such as, but not limited to, Facebook, LinkedIn, etc.). UI generator 610 (as described above with reference to FIG. 6) may be configured to analyze the communication session between the users (e.g., using machine learning techniques) and generate the language and/or terms based on the context of the messages communicated between the users.

Figure 12:
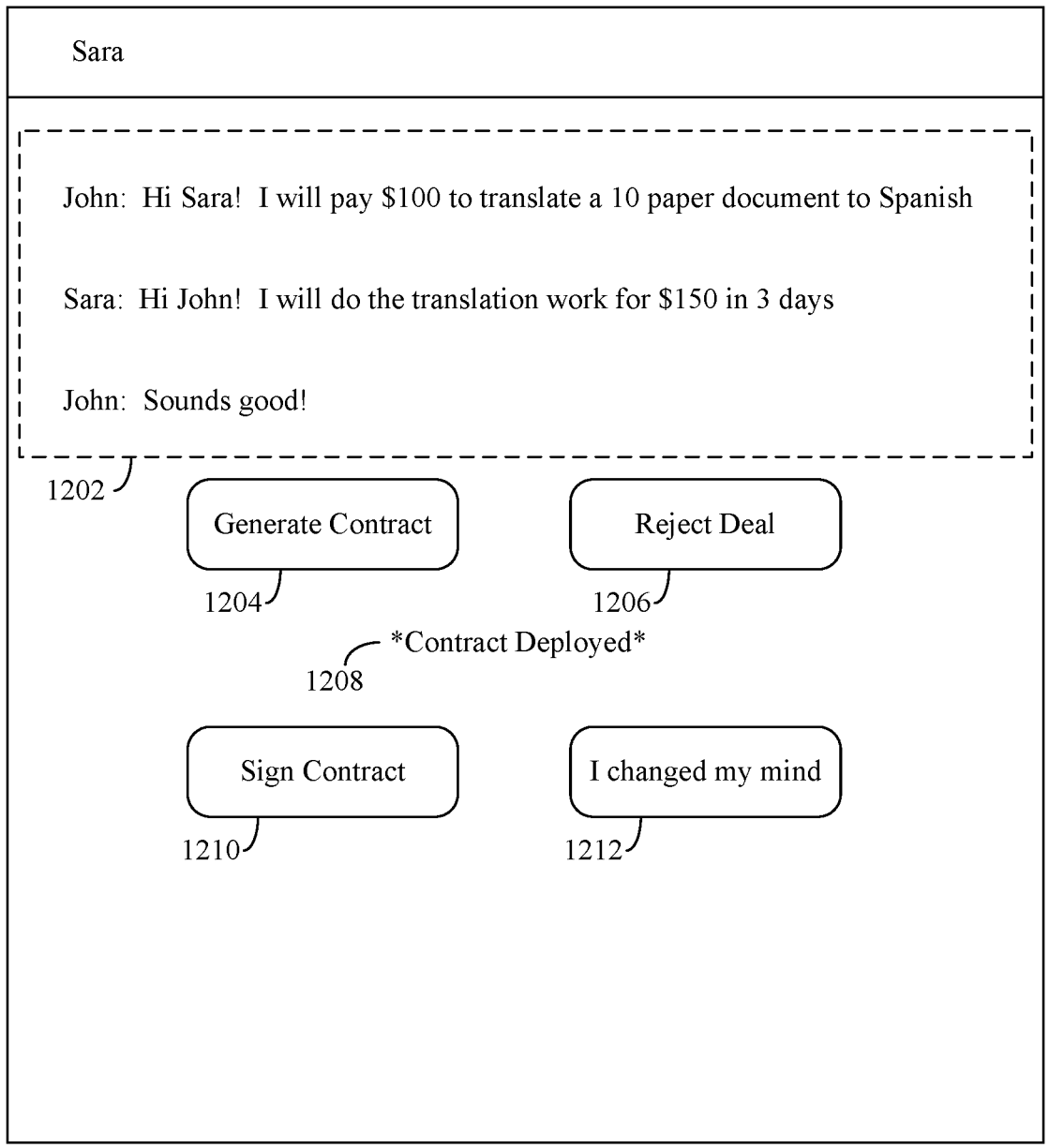
FIG. 12 is an example GUI screen that depicts a conversation between two users in accordance with an example embodiment.

For instance, FIG. 12 is an example GUI screen 1200 that depicts a conversation 1202 between two users in accordance with an example embodiment. As shown in FIG. 12, conversation 1202 is with regards to establishing a work agreement between John and Sara; in particular, a work agreement for translating a document into Spanish. UI generator 610 may be configured to analyze the messages and determine that John and Sara are negotiating a contract and determine the terms of the contract. The terms determined in this example would be the service provider ("Sara"), the consumer ("John"), the amount to be paid for the work by the consumer ("$150"), and a description of the work (e.g., document translation to Spanish).

After determining the terms of the contract, UI generator 610 may cause user interface elements to be rendered in the chat window utilized by both John and Sara that to generate the smart contract or to reject the agreement therebetween. For instance, as shown in FIG. 12, UI generator 610 causes user interface elements 1204 and 1206 to be rendered. User interface element 1204, when activated by the user, causes the smart contract to be generated. User interface element 1206, when activated by the user, enables the user to reject the agreement, and therefore, not causing the smart contract to be generated.

Upon both John and Sara activating their respective user interface element 1204, UI generator 610 may generate a smart contract based on the above-determined information, or alternatively, determine a smart contract template from which the smart contract will be based. In the latter situation, the above-determined information may be used to populate variables of the smart contract template during compilation of the smart contract in a manner as described above with reference to FIGS. 3 and 4.

After generating and compiling the smart contract, the smart contract is deployed to blockchain network 112 as described above with reference to FIGS. 3 and 4. Thereafter, UX generator 602 may query the smart contract (e.g., smart contract 604) to determine which actions each of John and Sara are allowed to perform with respect to smart contract 604 in a similar manner as described above with reference to FIGS. 6-10. For example, with reference to FIG. 12, UX generator 602 outputs a text string 1208 (which e.g., may be determined via UX annotations included in smart contract 604) and user interface elements 1210 and 1212 (which e.g., may be determined based on particular complimentary functions returning positive indications 622). Text string 1208 indicates the state of smart contract 604, user interface element 1210 enables the user (i.e., John or Sara) to sign smart contract 604, and user interface element 1212 enables the user to renege on smart contract 604. The user interface elements displayed to a particular user may differ based on the identity of the user and/or the state in which smart contract 604 is in, as described above with reference to FIGS. 6-10.

IV. Example Mobile Device Implementation

Figure 13:
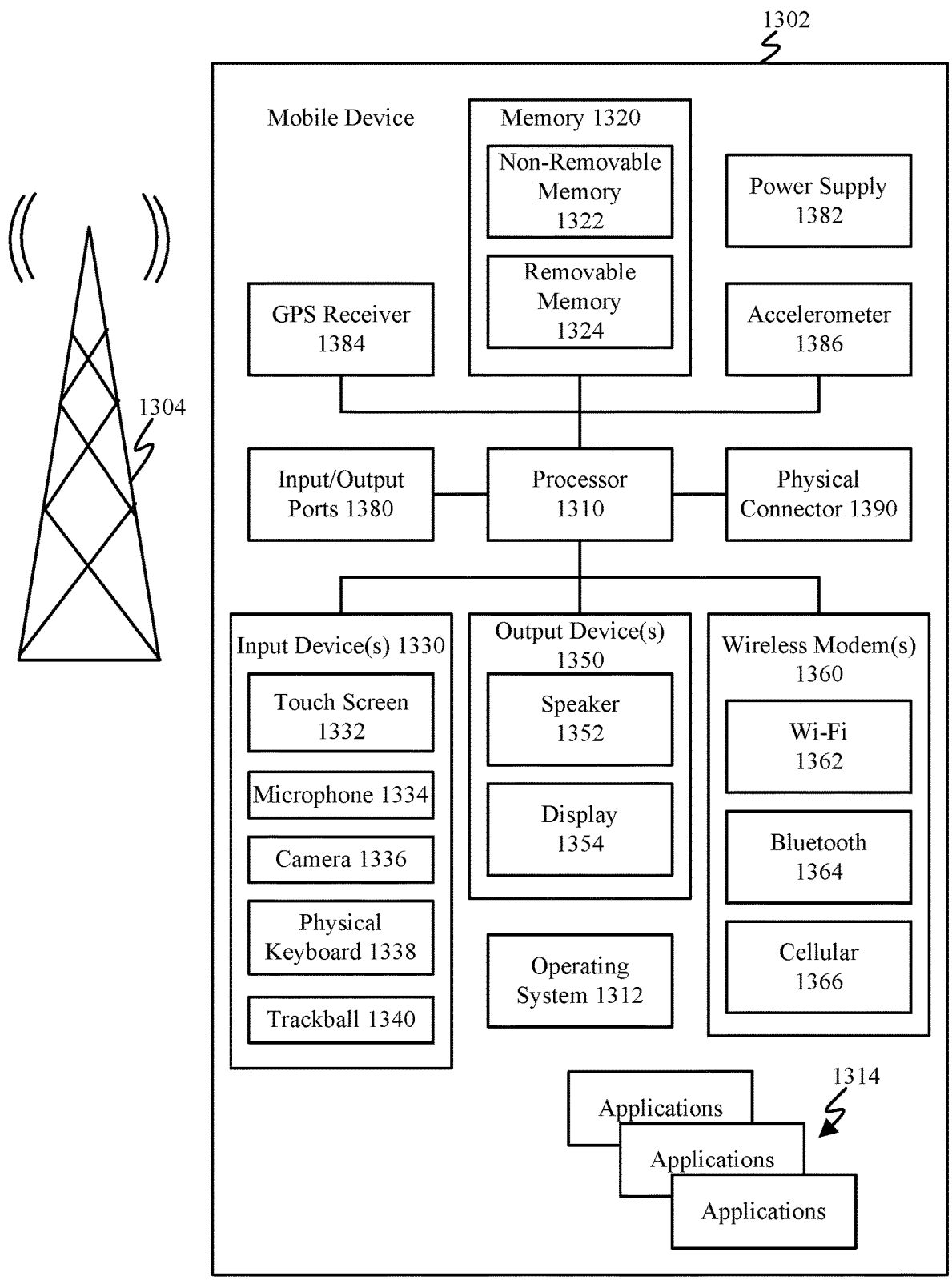
FIG. 13 is a block diagram of an exemplary mobile device that may implement embodiments described herein.

FIG. 13 is a block diagram of an exemplary mobile device 1302 that may implement embodiments described herein. For example, mobile device 1302 may be used to implement server 134, computing device 102A, computing device 102B, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer of FIG. 4, server 634, smart contract generator 606, UX generator 602, and user profiles 608 of FIG. 6, and/or any of the components respectively described therein and/or any of the steps of any of the flowcharts of FIGS. 3, 10, and 11. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smart phone, handheld computer, Personal Digital Assistant (PDA), etc.) and can allow wireless two-way communications with one or more mobile communications networks 1304, such as a cellular or satellite network, or with a local area or wide area network. Mobile device 1302 can also be any of a variety of wearable computing device (e.g., a smart watch, an augmented reality headset, etc.).

Mobile device 1302 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and provide support for one or more application programs 1314 (also referred to as "applications" or "apps"). Application programs 1314 may include common mobile computing applications (e.g., e-mail applications, calendars, contact managers, web browsers, messaging applications) and any other computing applications (e.g., word processing applications, mapping applications, media player applications).

Mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and application programs 1314. Example data can include web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Other possible output devices (not shown) can include piezoelectric or other haptic output devices. Some devices can serve more than one input/output function. For example, touch screen 1332 and display 1354 can be combined in a single input/output device. Input devices 1330 can include a Natural User Interface (NUI).

Wireless modem(s) 1360 can be coupled to antenna(s) (not shown) and can support two-way communications between processor 1310 and external devices, as is well understood in the art. Modem(s) 1360 are shown generically and can include a cellular modem 1366 for communicating with the mobile communication network 1304 and/or other radio-based modems (e.g., Bluetooth 1364 and/or Wi-Fi 1362). At least one of wireless modem(s) 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, mobile device 1302 is configured to implement any of the above-described features of server 134, computing device 102A, computing device 102B, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer of FIG. 4, server 634, smart contract generator 606, UX generator 602, and user profiles 608 of FIG. 6, and/or any of the components respectively described therein and/or any of the steps of any of the flowcharts of FIGS. 3, 10, and 11. Computer program logic for performing the functions of these devices may be stored in memory 1320 and executed by processor 1310.

V. Example Computer System Implementation

Figure 14:
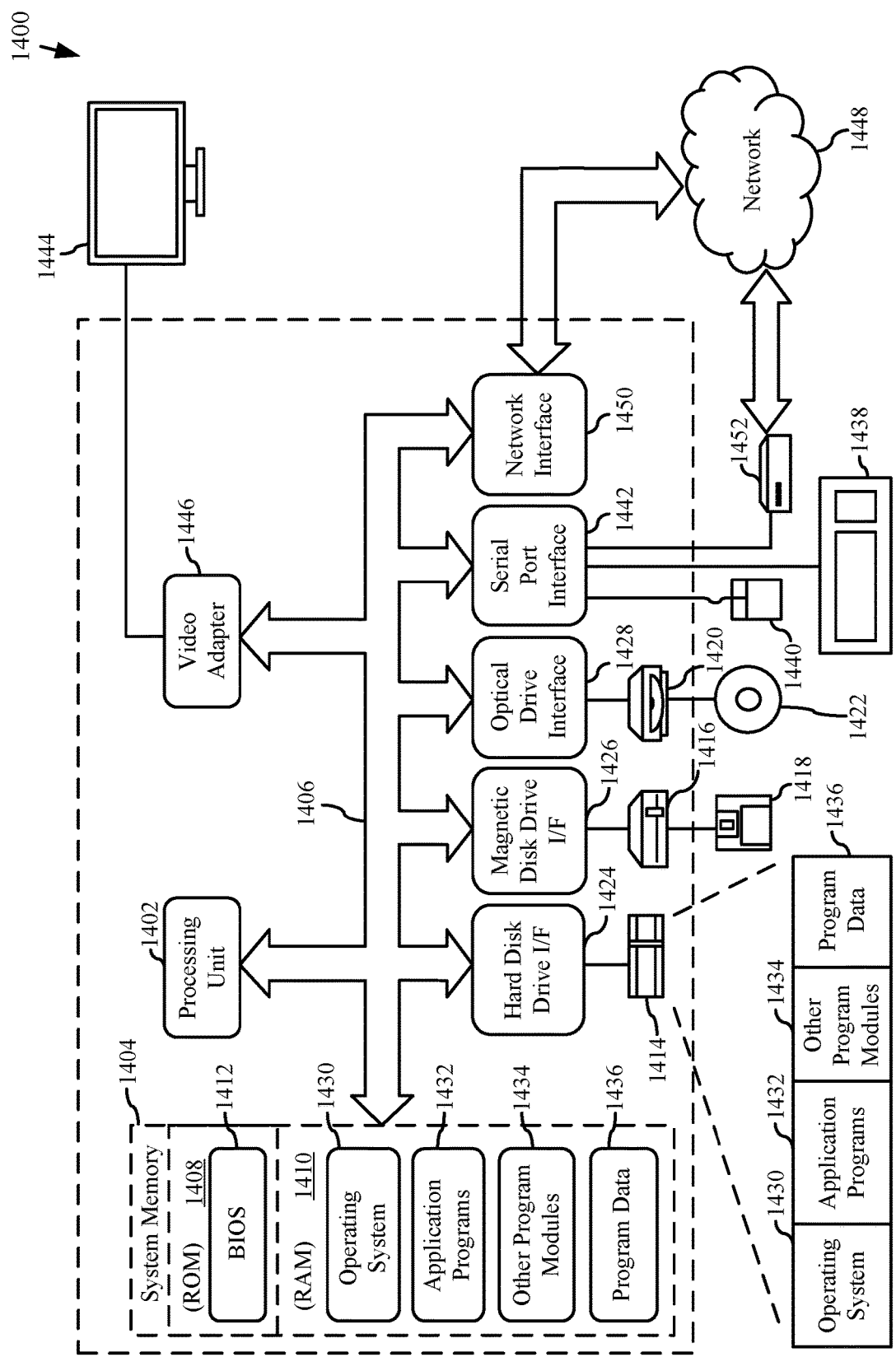
FIG. 14 is a block diagram of an example processor-based computer system that may be used to implement various embodiments.

FIG. 14 depicts an example processor-based computer system 1400 that may be used to implement various embodiments described herein. For example, system 1400 may be used to implement server 134, computing device 102A, computing device 102B, blockchain network 112, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer of FIG. 4, server 634, smart contract generator 606, UX generator 602, and user profiles 608 of FIG. 6, and/or any of the components respectively described therein. System 1400 may also be used to implement any of the steps of any of the flowcharts of FIGS. 3, 10, and 11, as described above. The description of system 1400 provided herein is provided for purposes of illustration, and is not intended to be limiting. Embodiments may be implemented in further types of computer systems, as would be known to persons skilled in the relevant art(s).

As shown in FIG. 14, system 1400 includes a processing unit 1402, a system memory 1404, and a bus 1406 that couples various system components including system memory 1404 to processing unit 1402. Processing unit 1402 may comprise one or more circuits, microprocessors or microprocessor cores. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

System 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, BLU-RAY™ disk or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to perform any or all of the functions and features of server 134, computing device 102A, computing device 102B, blockchain network 112, smart contract generator 106, UI generator 110, smart contract template library 118, GUI 116A, browser 136A, browser window 114A, display screen 108A, GUI 116B, browser 136B, browser window 114B, and display screen 108B of FIG. 1, server 434, smart contract generator 406, UI generator 410, variable replacer 402, compiler 404, and deployer of FIG. 4, server 634, smart contract generator 606, UX generator 602, and user profiles 608 of FIG. 6, and/or any of the components respectively described therein, and/or any of the steps of any of the flowcharts of FIGS. 3, 10, and 11, as described above. The program modules may also include computer program logic that, when executed by processing unit 1402, causes processing unit 1402 to perform any of the steps of any of the flowcharts of FIGS. 3, 10, and 11, as described above.

A user may enter commands and information into system 1400 through input devices such as a keyboard 1438 and a pointing device 1440 (e.g., a mouse). Other input devices (not shown) may include a microphone, joystick, game controller, scanner, or the like. In one embodiment, a touch screen is provided in conjunction with a display 1444 to allow a user to provide user input via the application of a touch (as by a finger or stylus for example) to one or more points on the touch screen. These and other input devices are often connected to processing unit 1402 through a serial port interface 1442 that is coupled to bus 1406, but may be connected by other interfaces, such as a parallel port, game port, or a universal serial bus (USB). Such interfaces may be wired or wireless interfaces.

Display 1444 is connected to bus 1406 via an interface, such as a video adapter 1446. In addition to display 1444, system 1400 may include other peripheral output devices (not shown) such as speakers and printers.

System 1400 is connected to a network 1448 (e.g., a local area network or wide area network such as the Internet) through a network interface 1450, a modem 1452, or other suitable means for establishing communications over the network. Modem 1452, which may be internal or external, is connected to bus 1406 via serial port interface 1442.

As used herein, the terms "computer program medium," "computer-readable medium," and "computer-readable storage medium" are used to generally refer to memory devices or storage structures such as the hard disk associated with hard disk drive 1414, removable magnetic disk 1418, removable optical disk 1422, as well as other memory devices or storage structures such as flash memory cards, digital video disks, random access memories (RAMs), read only memories (ROM), and the like. Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable system 1400 to implement features of embodiments discussed herein. Accordingly, such computer programs represent controllers of the system 1400. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1400 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Further Example Embodiments

A computer-implemented method is described herein. The method includes:

deploying a smart contract that has been agreed upon by a plurality of users to a blockchain maintained by a computing platform; identifying a user of the plurality of users; querying the smart contract deployed to the blockchain on behalf of the identified user to determine an action that may be performed by the identified user with respect to the smart contract; generating a user interface representation of the action; and presenting the user interface representation via a user interface associated with the identified user.

In one implementation of the foregoing method, said deploying comprises: replacing one or more variables of the smart contract with one or more user-specified parameters; compiling the smart contract with the user-specified parameters into a format suitable for the blockchain; and causing the compiled smart contract to be deployed to the blockchain for execution thereby.

In another implementation of the foregoing method, said querying comprises: receiving, from the smart contract, an event notification that indicates that a state of the smart contract has changed; and querying a function of the smart contract that is configured to provide an indication as to whether the identified user is enabled to perform the action based on one or more inputs provided to the function; wherein said presenting comprises: responsive to the indication indicating that the identified user is enabled to perform the action, presenting the user interface representation.

In another implementation of the foregoing method, the function queried is determined based on an artifacts file that specifies a plurality of functions associated with the smart contract, the artifacts file being generated during compilation of the smart contract.

In another implementation of the foregoing method, the one or more inputs comprise at least one of: the state of the smart contract; or an identifier of the identified user.

In another implementation of the foregoing method, the user interface representation comprises at least one of: a text string; a user-selectable element; an email message; a text message; or an audio notification.

In another implementation of the foregoing method, the text string is based on an annotation associated with the function of the smart contract.

A system is also described herein. The system includes: at least one processor circuit; and at least one memory that stores program code configured to be executed by the at least one processor circuit, the program code comprising: a user experience generator configured to: deploy a smart contract that has been agreed upon by a plurality of users to a blockchain maintained by a computing platform; identify a user of the plurality of users; query the smart contract deployed to the blockchain on behalf of the identified user to determine an action that may be performed by the identified user with respect to the smart contract; generate a user interface representation of the action; and present the user interface representation via a user interface associated with the identified user.

In one implementation of the foregoing system, the user experience generator is further configured to: replace one or more variables of the smart contract with one or more user-specified parameters; compile the smart contract with the user-specified parameters into a format suitable for the blockchain; and cause the compiled smart contract to be deployed to the blockchain for execution thereby.

In another implementation of the foregoing system, the user experience generator is further configured to: receive, from the smart contract, an event notification that indicates that a state of the smart contract has changed; query a function of the smart contract that is configured to provide an indication as to whether the identified user is enabled to perform the action based on one or more inputs provided to the function; and responsive to the indication indicating that the identified user is enabled to perform the action, present the user interface representation.

In another implementation of the foregoing system, the function queried is determined based on an artifacts file that specifies a plurality of functions associated with the smart contract, the artifacts file being generated during compilation of the smart contract.

In another implementation of the foregoing system, the one or more inputs comprise at least one of: the state of the smart contract; or an identifier of the identified user.

In another implementation of the foregoing system, the user interface representation comprises at least one of: a text string; a user-selectable element; an email message; a text message; or an audio notification.

In another implementation of the foregoing system, the text string is based on an annotation associated with the function of the smart contract.

A computer-readable storage medium having program instructions recorded thereon that, when executed by at least one processor, perform a method. The method includes: deploying a smart contract that has been agreed upon by a plurality of users to a blockchain maintained by a computing platform; identifying a user of the plurality of users; querying the smart contract deployed to the blockchain on behalf of the identified user to determine an action that may be performed by the identified user with respect to the smart contract; generating a user interface representation of the action; and presenting the user interface representation via a user interface associated with the identified user.

In another implementation of the foregoing computer-readable storage medium, said deploying comprises: replacing one or more variables of the smart contract with one or more user-specified parameters; compiling the smart contract with the user-specified parameters into a format suitable for the blockchain; and causing the compiled smart contract to be deployed to the blockchain for execution thereby.

In another implementation of the foregoing computer-readable storage medium, said querying comprises: receiving, from the smart contract, an event notification that indicates that a state of the smart contract has changed; and querying a function of the smart contract that is configured to provide an indication as to whether the identified user is enabled to perform the action based on one or more inputs provided to the function; wherein said presenting comprises: responsive to the indication indicating that the identified user is enabled to perform the action, presenting the user interface representation.

In another implementation of the foregoing computer-readable storage medium, the function queried is determined based on an artifacts file that specifies a plurality of functions associated with the smart contract, the artifacts file being generated during compilation of the smart contract.

In another implementation of the foregoing computer-readable storage medium, the one or more inputs comprise at least one of: the state of the smart contract; or an identifier of the identified user.

In another implementation of the foregoing computer-readable storage medium, the user interface representation comprises at least one of: a text string; a user-selectable element; an email message; a text message; or an audio notification.

VII. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A computer-implemented method, comprising:
   deploying a smart contract that has been agreed upon by a plurality of users to a blockchain maintained by a computing platform;
   identifying a user of the plurality of users;
   receiving an event notification from the smart contract that indicates that a state of the smart contract has changed;
   in response to receiving the event notification, providing a query, that identifies the identified user and specifies the state, to a function included in the smart contract deployed to the blockchain on behalf of the identified user to determine an action that may be performed by the identified user with respect to the smart contract;
   receiving an indication from the function that indicates that the identified user is enabled to perform the action in accordance with the state;
   responsive to receiving the indication:
      generating a user interface representation of the action; and
      presenting the user interface representation via a user interface that is custom-generated for the identified user.

2. The method of claim 1, wherein said deploying comprises:
   replacing one or more variables of the smart contract with one or more user-specified parameters;
   compiling the smart contract with the user-specified parameters into a format suitable for the blockchain; and
   causing the compiled smart contract to be deployed to the blockchain for execution thereby.

3. The method of claim 1, wherein the function queried is determined based on an artifacts file that specifies a plurality of functions associated with the smart contract, the artifacts file being generated during compilation of the smart contract.

4. The method of claim 1, wherein the identified user and the state are provided as inputs to the function.

5. The method of claim 1, wherein the user interface representation comprises at least one of:
   a text string;
   a user-selectable element;
   an email message;
   a text message; or
   an audio notification.

6. The method of claim 1, wherein the user interface representation comprises a text string, and wherein the text string is based on an annotation associated with the function of the smart contract.

7. The method of claim 6, wherein the annotation comprises one or more variables utilized by the smart contract and that are populated during execution of the smart contract.

8. A system, comprising:
   at least one processor circuit; and
   at least one memory that stores program code configured to be executed by the at least one processor circuit, the program code comprising:
      a user experience generator configured to:
         deploy a smart contract that has been agreed upon by a plurality of users to a blockchain maintained by a computing platform;
         identify a user of the plurality of users;
         receive an event notification from the smart contract that indicates that a state of the smart contract has changed;
         in response to receiving the event notification, provide a query, that identifies the identified user and specifies the state, to a function included in the smart contract deployed to the blockchain on behalf of the identified user to determine an action that may be performed by the identified user with respect to the smart contract;
         receive an indication from the function that indicates that the identified user is enabled to perform the action in accordance with the state;
         response to receiving the indication:
            generate a user interface representation of the action; and
            present the user interface representation via a user interface that is custom-generated for the identified user.

9. The system of claim 8, wherein the user experience generator is further configured to:
   replace one or more variables of the smart contract with one or more user-specified parameters;
   compile the smart contract with the user-specified parameters into a format suitable for the blockchain; and
   cause the compiled smart contract to be deployed to the blockchain for execution thereby.

10. The system of claim 8, wherein the function queried is determined based on an artifacts file that specifies a plurality of functions associated with the smart contract, the artifacts file being generated during compilation of the smart contract.

11. The system of claim 8, wherein the identified user and the state are provided as inputs to the function.

12. The system of claim 8, wherein the user interface representation comprises at least one of:
   a text string;
   a user-selectable element;
   an email message;
   a text message; or
   an audio notification.

13. The system of claim 8, wherein the user interface representation comprises a text string, and wherein the text string is based on an annotation associated with the function of the smart contract.

14. The system of claim 13, wherein the annotation comprises one or more variables utilized by the smart contract and that are populated during execution of the smart contract.

15. A computer-readable storage medium having program instructions recorded thereon that, when executed by at least one processor, perform a method, the method comprising:
   deploying a smart contract that has been agreed upon by a plurality of users to a blockchain maintained by a computing platform;
   receiving an event notification from the smart contract that indicates that a state of the smart contract has changed;
   in response to receiving the event notification, providing a query, that identifies the identified user and specifies the state, to a function included in the smart contract deployed to the blockchain on behalf of the identified user to determine an action that may be performed by the identified user with respect to the smart contract;
   receiving an indication from the function that indicates that the identified user is enabled to perform the action in accordance with the state;
   responsive to receiving the indication:
      generating a user interface representation of the action; and
      presenting the user interface representation via a user interface that is custom-generated for the identified user.

16. The computer-readable storage medium of claim 15, wherein said deploying comprises:
   replacing one or more variables of the smart contract with one or more user-specified parameters;
   compiling the smart contract with the user-specified parameters into a format suitable for the blockchain; and
   causing the compiled smart contract to be deployed to the blockchain for execution thereby.

17. The computer-readable storage medium of claim 15, wherein the function queried is determined based on an artifacts file that specifies a plurality of functions associated with the smart contract, the artifacts file being generated during compilation of the smart contract.

18. The computer-readable storage medium of claim 15, wherein the identified user and the state are provided as inputs to the function.

19. The computer-readable storage medium of claim 15, wherein the user interface representation comprises at least one of:
   a text string;
   a user-selectable element;
   an email message;
   a text message; or
   an audio notification.

20. The computer-readable storage medium of claim 15, wherein the user interface representation comprises a text string, and wherein the text string is based on an annotation associated with the function of the smart contract.

* * * * *